(12) United States Patent
Jawidzik et al.

(10) Patent No.: US 12,523,279 B2
(45) Date of Patent: Jan. 13, 2026

(54) ROBUST PUSH-PUSH CONNECTOR

(71) Applicant: Alcon Inc., Fribourg (CH)

(72) Inventors: Geoffrey C. Jawidzik, Mission Viejo, CA (US); Marc Nestor, Aliso Viejo, CA (US)

(73) Assignee: Alcon Inc., Fribourg (CH)

( * ) Notice: Subject to any disclaimer, the term of this patent is extended or adjusted under 35 U.S.C. 154(b) by 57 days.

(21) Appl. No.: 18/596,949

(22) Filed: Mar. 6, 2024

(65) Prior Publication Data

US 2024/0337309 A1   Oct. 10, 2024

Related U.S. Application Data

(60) Provisional application No. 63/494,308, filed on Apr. 5, 2023.

(51) Int. Cl.
  *F16H 21/44*  (2006.01)
(52) U.S. Cl.
  CPC ..................... *F16H 21/44* (2013.01)
(58) Field of Classification Search
  CPC ....................................................... F16H 21/44
  See application file for complete search history.

(56) References Cited

U.S. PATENT DOCUMENTS

| | | |
|---|---|---|
| 2,565,873 A | 8/1951 | Meyer |
| 4,482,175 A | 11/1984 | Sugie |
| 4,657,292 A * | 4/1987 | Bruck ............... E05B 77/06 292/DIG. 4 |
| 4,669,764 A | 6/1987 | Bruck |
| 4,917,416 A * | 4/1990 | Westphal ............. E05C 1/04 292/DIG. 47 |
| 5,090,751 A * | 2/1992 | Kobayashi ............ E05B 77/06 292/210 |
| 5,498,039 A * | 3/1996 | Bivens ................ B60N 3/08 292/145 |
| 5,657,969 A | 8/1997 | Bivens |
| 5,818,691 A | 10/1998 | Mcmahan |
| 6,048,001 A | 4/2000 | Miller |
| 6,669,250 B1 | 12/2003 | St. Louis |
| 6,739,633 B2 | 5/2004 | Holloway |
| 7,165,790 B2 | 1/2007 | Bella |
| 7,261,574 B2 | 8/2007 | Deluga |

(Continued)

FOREIGN PATENT DOCUMENTS

| | | |
|---|---|---|
| CA | 2698505 A1 | 9/2011 |
| JP | 2013213336 A | 10/2013 |

(Continued)

*Primary Examiner* — Mark A Williams

(57) ABSTRACT

The present disclosure generally relates to movable coupling mechanisms, and more particularly, to push-push devices for adjustably coupling a first object to a second object. In some embodiments, the push-push device includes a shuttle block configured to be coupled to the first object, a track block configured to be coupled to the second object, and an arm rotatably coupled to the shuttle block at a distal end of the arm and slidably coupled to the track back at a proximal end of the arm. The push-push device may also include one or more first springs configured to apply a torsional preload force to the arm, and one or more second springs configured to apply a linear preload force between the shuttle block and the track block.

7 Claims, 16 Drawing Sheets

(56) References Cited

U.S. PATENT DOCUMENTS

| | | | |
|---|---|---|---|
| 7,314,389 B1* | 1/2008 | Yu | H01R 13/631 |
| | | | 439/630 |
| 8,414,037 B2 | 4/2013 | Wang | |
| 9,714,531 B2 | 7/2017 | Vigneau | |
| 2004/0075281 A1* | 4/2004 | Ueki | E05C 19/022 |
| | | | 292/65 |
| 2004/0119297 A1* | 6/2004 | Bella | A45D 40/24 |
| | | | 292/300 |
| 2006/0208506 A1 | 9/2006 | Kern | |
| 2006/0261606 A1 | 11/2006 | Bella | |
| 2007/0120380 A1 | 5/2007 | Bella | |
| 2009/0308930 A1* | 12/2009 | Poguntke | G06K 13/0806 |
| | | | 235/486 |
| 2014/0125071 A1 | 5/2014 | Mcwilliams | |
| 2014/0265365 A1 | 9/2014 | Vigneau | |
| 2015/0035293 A1 | 2/2015 | Vigneau | |
| 2015/0108891 A1 | 4/2015 | Brunnmayr | |
| 2015/0354611 A1* | 12/2015 | Wasankari | F16B 2/18 |
| | | | 403/321 |
| 2018/0082815 A1* | 3/2018 | Balgheim | H01F 7/14 |
| 2019/0309542 A1* | 10/2019 | Wang | E05C 3/12 |

FOREIGN PATENT DOCUMENTS

| | | |
|---|---|---|
| JP | 2017227376 A | 12/2017 |
| WO | 2013073489 A1 | 5/2013 |

\* cited by examiner

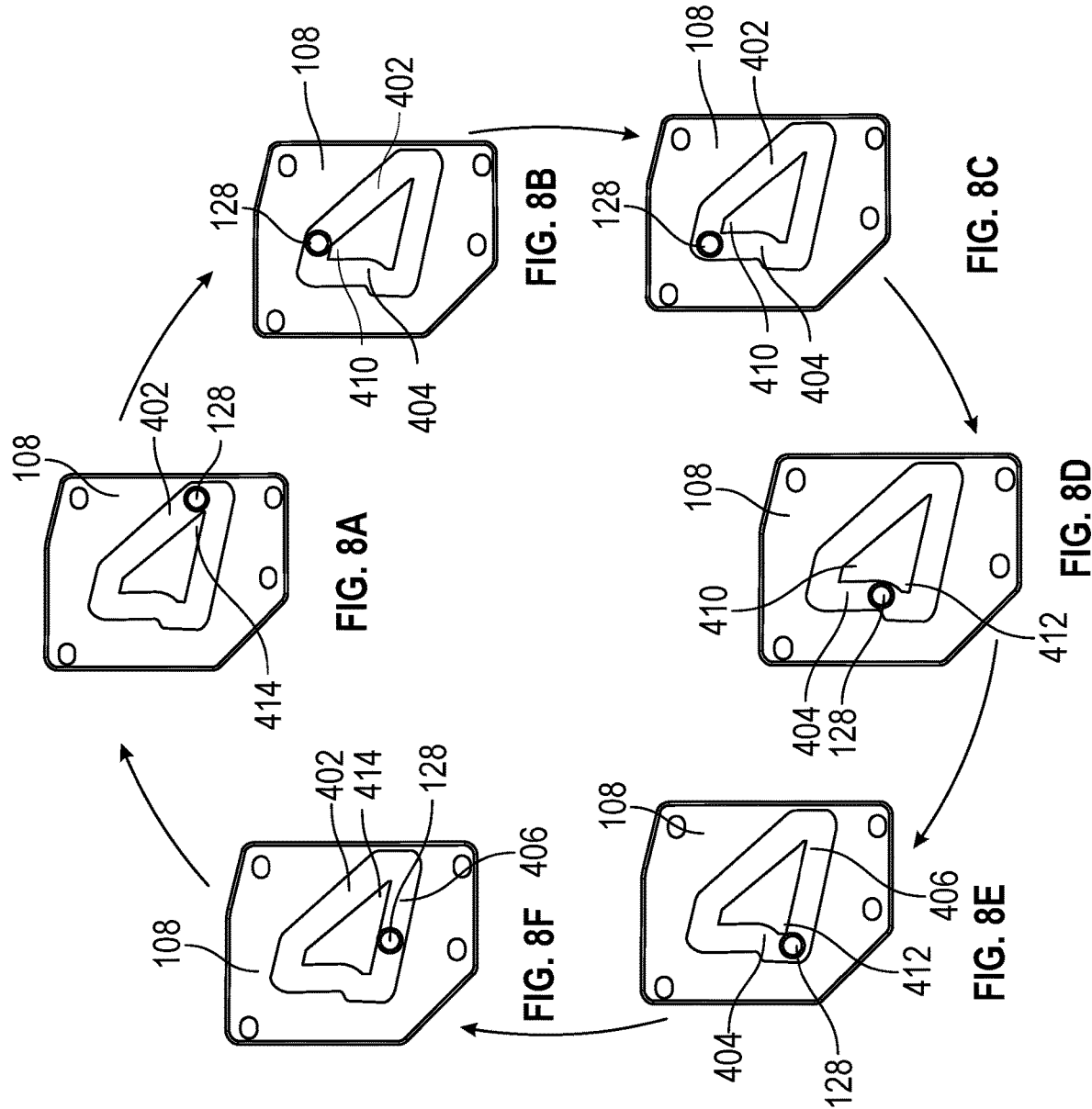

ROBUST PUSH-PUSH CONNECTOR

BACKGROUND

Push-push mechanisms may be used in various applications to guide interaction between two or more objects. Push-push mechanisms are characterized as mechanical mechanisms that are activated by applying a force in the same direction to shift a device between one of at least two stable states. In some examples, push-push mechanisms may be utilized as latching mechanisms in which a one-directional force is applied to attach and release a first object from a second object, such as to unlock and lock a closure (e.g., a hinged cabinet or sliding drawer). In some examples, push-push mechanisms may be utilized as adjustable connectors in which a one-directional force is applied to extend and retract a first object from a second object. Common examples of such push-push adjustable connectors include the mechanisms used in legs of a camera tripod or the adjustable tip of a retractable pen.

Various configurations of push-push latches and connectors are known. However, many such configurations rely on fragile components or mechanisms that are susceptible to damage from improper use by a user.

SUMMARY

Embodiments of the present disclosure generally relate to coupling mechanisms for instruments and devices, and more specifically, to push-push mechanisms for coupling one or more objects together. In certain embodiments, a push-push device for adjustably coupling a first object to a second object is provided. The push-push device includes a shuttle block configured to be coupled to the first object, a track block configured to be coupled to the second object, and an arm having a distal end and a proximal end. The distal end of the arm rotatably couples to the shuttle block, and the proximal end of the arm slidably couples to a recessed track in the track block. The push-push device also includes one or more first springs disposed between the distal end of the arm and the shuttle block and one or more second springs extending between the track block and the shuttle block. The one or more first springs may be configured to apply a torsional preload force to the arm while the one or more second springs may be configured to apply a linear preload force between a distal end of the track block and a proximal end of the shuttle block. When a push force is applied to a distal end of the shuttle block and is directed towards the distal end of the track block, the distal end of the arm is configured to rotate relative to the shuttle block and the proximal end of the arm is configured to move along the recessed track of the track block. When the proximal end of the arm moves along the recessed track in response to the push force, the push-push device is configured to transition between a latched state and an unlatched state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIGS. 8A-8F show corresponding views of the position and movement of a portion of the connector when the connector is operated as depicted in FIGS. 7A-7F, according to certain embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
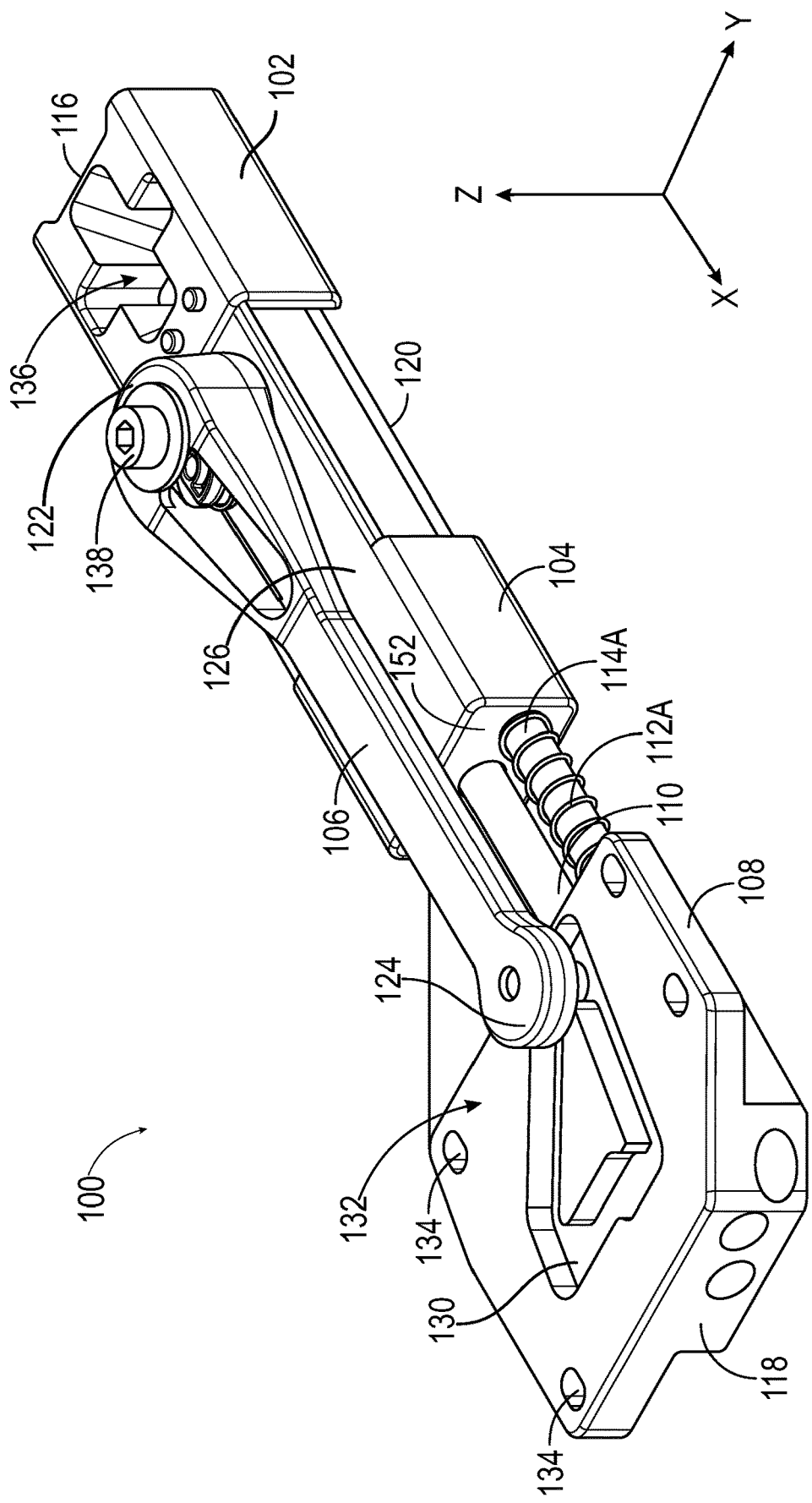
FIGS. 1A-1D show a perspective view, a top view, a bottom view, and a side view, respectively, of an exemplary push-push connector, according to certain embodiments.
Figure 1B:
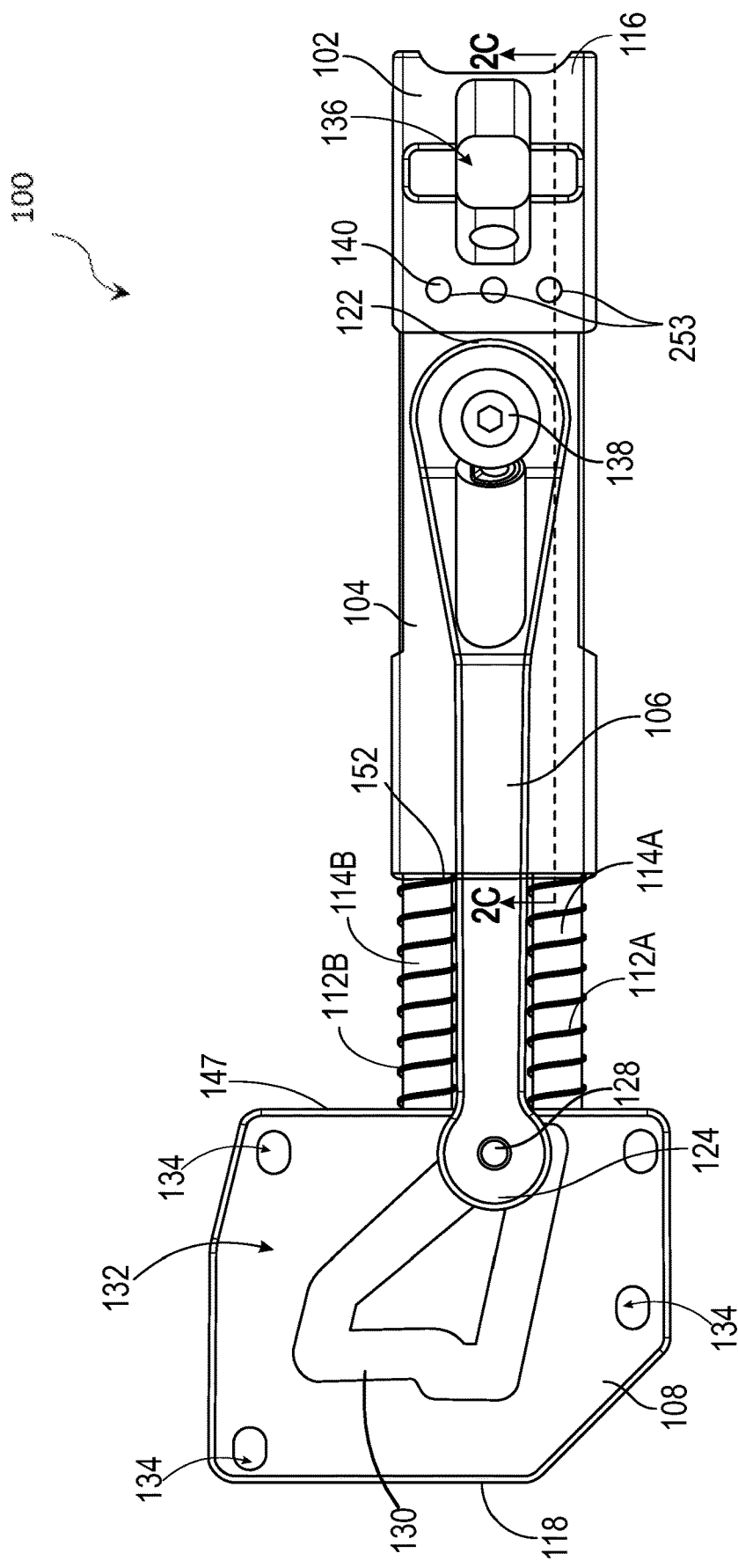

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Note that, as described herein, a distal end, segment, or portion of a component refers to the end, segment, or portion that is closer to a user during use thereof when a push force is applied. On the other hand, a proximal end, segment, or portion of the component refers to the end, segment, or portion that is distanced further away from the user when the push force is applied.

Embodiments of the present disclosure generally relate to push-push mechanisms for use with medical instruments and devices, among other apparatuses.

Various configurations of push-push latches and connectors are known. For example, certain conventional push-push mechanisms include a latching arm configured to translate laterally to execute a cycle in a mechanical track between a latched and unlatched state. As the arm travels through the track, the arm itself gradually deflects perpendicularly to the loop such that, at the end of a cycle, an end of the arm is caused to travel over a vertical edge in the surface of the track, which prevents reverse motion thereof. This effectively "resets" the cycle to a starting position. However, the arm deflecting perpendicularly to the track may result in the push-push mechanism being somewhat fragile, as relatively large forces in tension may cause the arm to dislodge from the track. Such dislodgement can lead to improper function of or even damage to the arm and/or other components of the push-push mechanism.

In other examples, the arm may be relatively rigid and strong but not preloaded. In such examples, the arm may reach the latched or unlatched states by being directed by the shape of the track itself, which may not work effectively unless arranged in a particular orientation relative to gravity.

The following description provides a robust push-push mechanism that addresses many of the issues associated with conventional push-push devices. Certain embodiments of the present disclosure provide a robust push-push mechanism that may be utilized in a variety of applications requiring a first object to be adjustably, or movably, coupled to a second object for deployment and retraction of the first object. For example, in certain embodiments, the described push-push mechanism may be utilized in medical instruments and devices. One such example of a suitable medical device includes a footswitch for a surgical procedure. More particularly, the described push-push mechanism may be utilized to connect a safety shroud (e.g., first object) for a footswitch to a stationary base (e.g., second object) of the footswitch such that the shroud may be adjusted between an extended position, for use, and a retracted position, for stowing and charging the footswitch. Certain embodiments described herein therefore enable the shroud of a footswitch to both be extended and retracted by the same pushing action. Although specific examples presented herein refer to a shroud for surgical footswitch, it is to be understood that examples of the present disclosure may be utilized in any application benefitting from the incorporation of a push-push connector that can facilitate extension and retraction of an object between a plurality of states relative to another stationary object.

FIGS. 1A-1D show a perspective, top, bottom, and side view, respectively, of an exemplary push-push connector, according to certain embodiments. FIGS. 1A-1D are herein described together for clarity. The push-push connector (hereinafter referred to as a "connector") 100 includes a rod block 102 disposed at a distal end 116 of the connector 100, a track block 108 disposed at a proximal end 118 of the connector 100, and a shuttle block 104 disposed between the rod block 102 and the track block 108. The rod block 102 is coupled to the shuttle block 104 by a latch plate 120. The connector 100 includes a main rod 110 extending though the shuttle block 104 between the track block 108 and rod block 102. The connector 100 also includes an arm 106, a pair of compression springs 112A, 112B, and a pair of compression spring rods 114A, 114B extending between the shuttle block 104 and the track block 108. In other embodiments, the pair of compression springs 112A, 112B include extension springs, helical springs, or torsion springs. Generally, the connector 100 is actuated by pushing the rod block 102 and the shuttle block 104 connected therewith towards the track block 108. As the rod block 102 is pushed towards the track block 108, movement of the arm 106 relative to the track block 108 enables the rod block 102 to transition between an extended and a retracted position relative to the track block 108, described in further detail below. The transitioning of the rod block 102 between the extended and retracted positions in turn transitions the connector 100 between an unlatched state and a latched state, respectively.

The arm 106 includes a distal end 122 rotationally coupled to a top surface 126 of the shuttle block 104, and a proximal end 124 slidably coupled to a top surface 132 of the track block 108. The distal end 122 of the arm 106 is secured to the shuttle block 104 by a fastener 138. The proximal end 124 of the arm 106 is secured to the track block 108 by a dowel pin 128 extending from the arm 106 into a recessed track 130 formed in the top surface 132 of the track block 108. The recessed track 130 defines a path that the dowel pin 128 (and the proximal end 124 of the arm 106 attached therewith) travels along when the connector 100 is actuated and the arm 106 (and the shuttle block 104 attached therewith) is pushed towards or pulled away from the track block 108.

The compression springs 112A, 112B and compression spring rods 114A, 114B extend between a proximal end 152 of the shuttle block 104 and a distal end 147 of the track block 108 parallel to and on opposite sides of the main rod 110. As noted above in certain embodiments, each of the compression springs 112A, 112B may include helical springs for generating a linear preload force between the shuttle block 104 and the track block 108. The compression spring rods 114A, 114B extending through the compression springs 112A, 112B prevent the compression springs 112A, 112B from buckling and facilitate rectilinear alignment and stability. Along with the compression spring rods 114A, 114B, the main rod 110 aligns the rod block 102 and shuttle block 104 with the track block 108. The main rod 110 therefore permits only rectilinear motion of the rod block 102 and the shuttle block 104 relative to the track block 108 along a longitudinal axis of the main rod 110 parallel to an X-axis when the rod block 102 is pushed towards the track block 108.

Figure 1C:
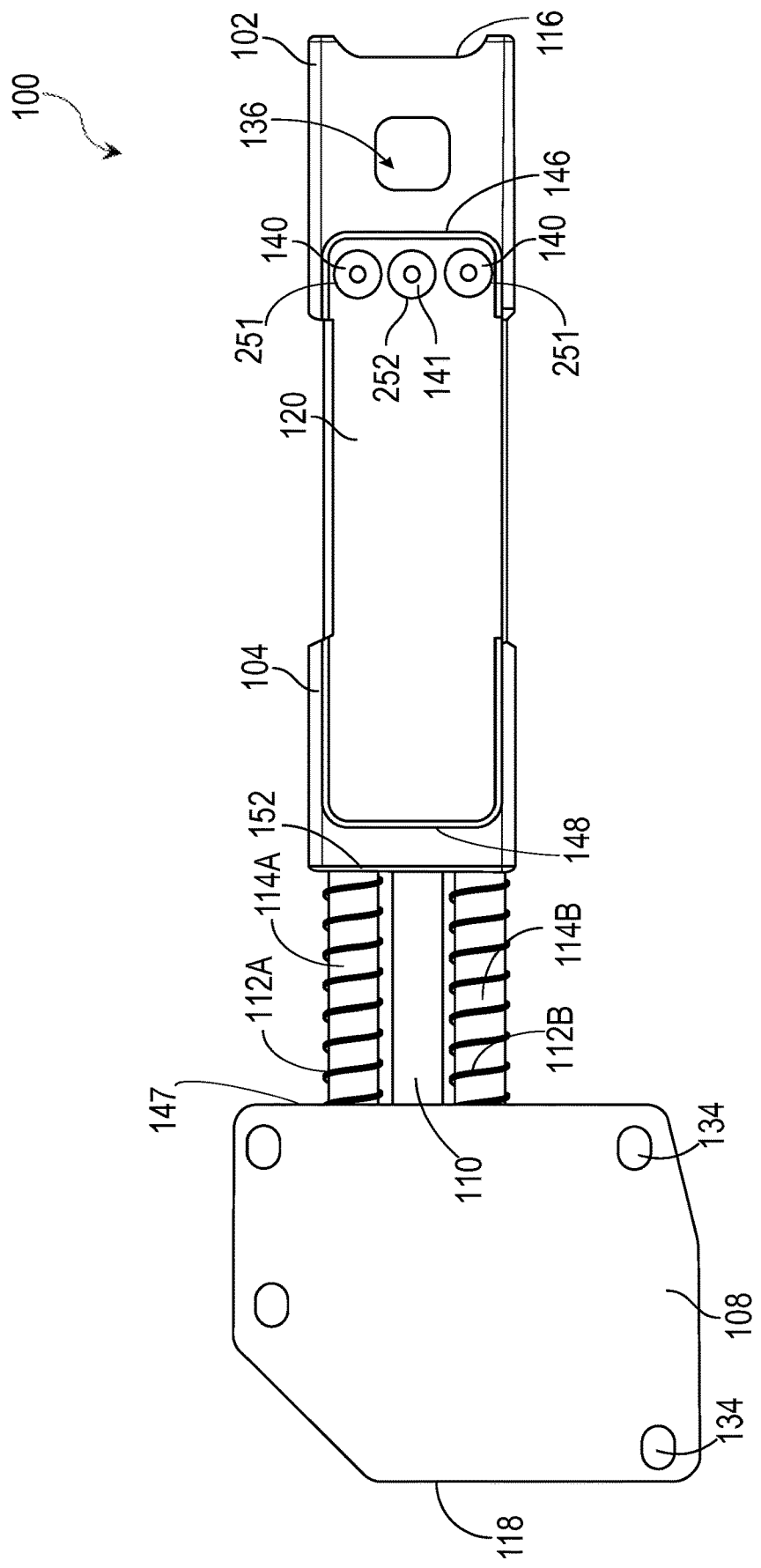
Figure 1D:
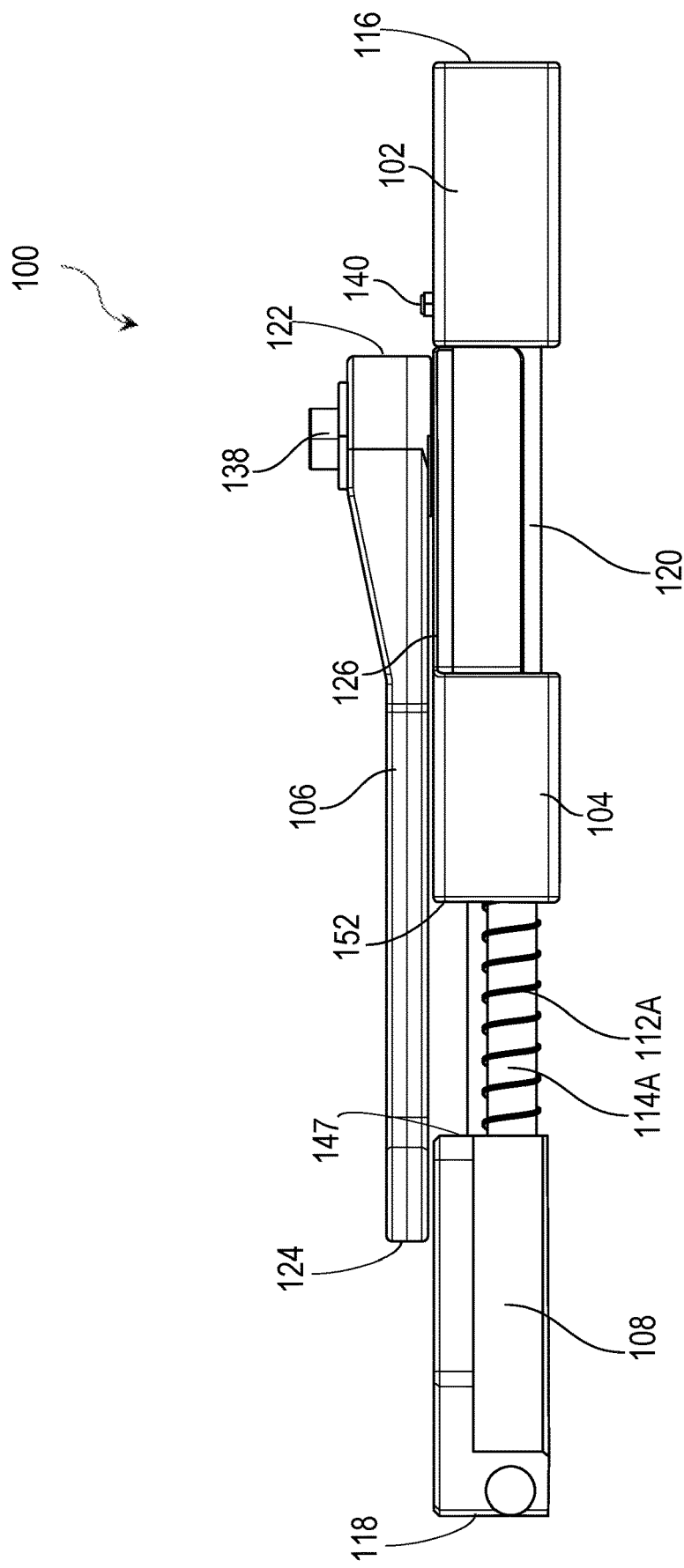

As shown in FIG. 1C, the latch plate 120 extends across a bottom side of the connector 100 between the shuttle block 104 and the rod block 102. The latch plate 120 secures the rod block 102 to the shuttle block 104. The latch plate 120 includes three bores (shown as either 251 or 252) linearly aligned along a distal end 146 of the latch plate 120, with two side bores 251 flanking a center bore 252. The latch plate 120 may be affixed to the rod block 102 by threading two fasteners 140 through the two side bores 251 in the latch plate 120 and into two corresponding bores 253 in the rod block 102. The latch plate 120 may also affixed to the main rod 110 extending through the shuttle block 104 by threading a fastener 141 through the center bore 252*vin* the latch plate 120 and into a distal end of the main rod 110. A proximal end 148 of the latch plate 120 is removably coupled to the shuttle block 104. When the proximal end 148 of the latch plate 120 is disconnected from the shuttle block 104, the rod block 102, the main rod 110, and the latch plate 120 become movable relative to the shuttle block 104 and may be separated from the shuttle block 104.

The connector 100 is configured to adjustably couple a first object to a second object. The second object may be a stationary object or a stationary surface (e.g., surface of a stationary base or object). When the first object is adjustably coupled to the second object by the connector 100, the first object is movable relative to the second object. The track block 108 includes a plurality of bores 134 for securing the track block 108 to the second object. Meanwhile, the rod block 102 includes a pocket 136 extending through the center of the rod block 102. The pocket 136 may be used to secure the rod block 102 to the first object. The first object may then be pushed towards the second object by the user to actuate the connector 100.

Figure 2A:
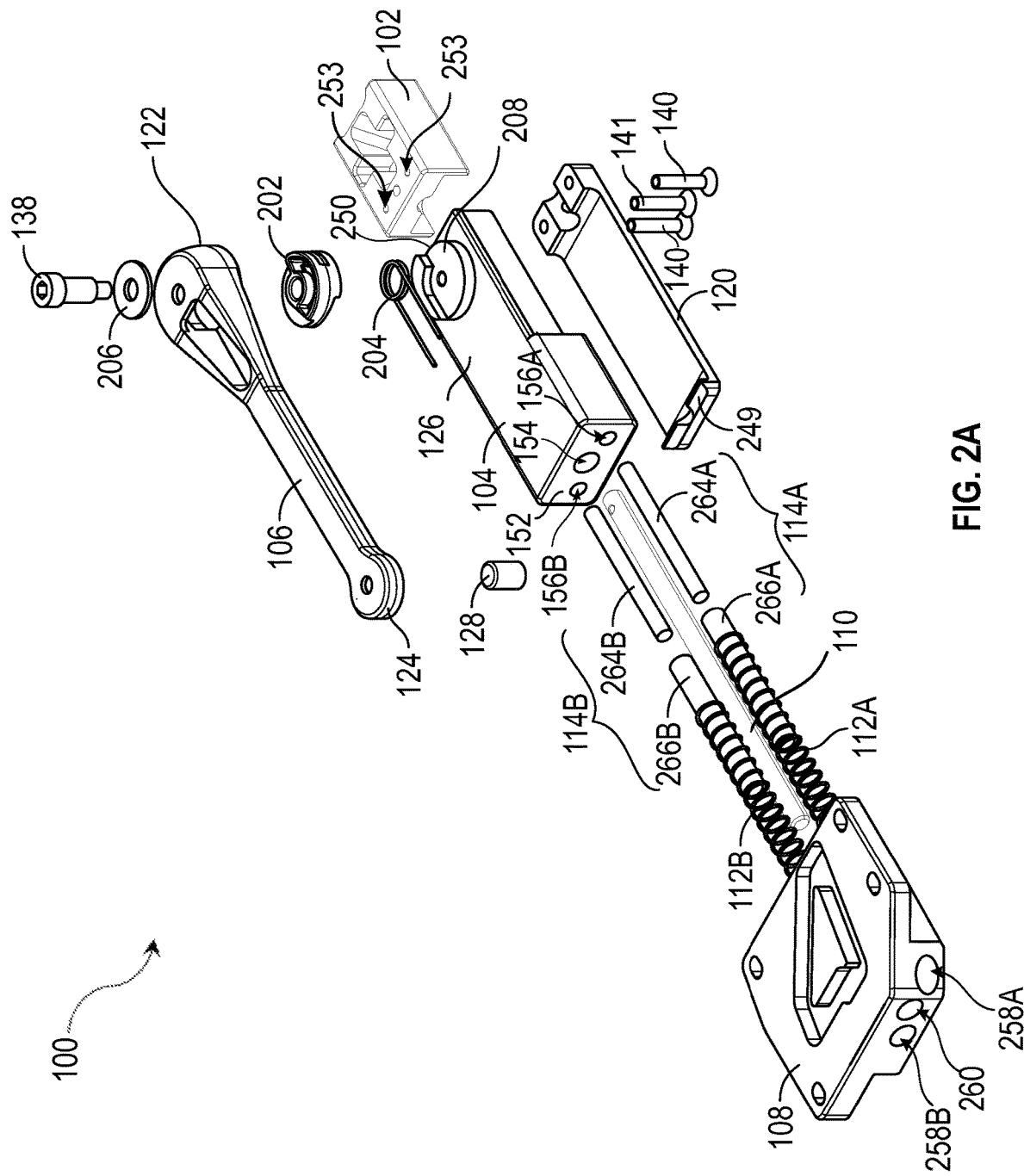
FIG. 2A shows an exploded perspective view of the connector depicted in FIGS. 1A-1D, according to certain embodiments.
Figure 2B:
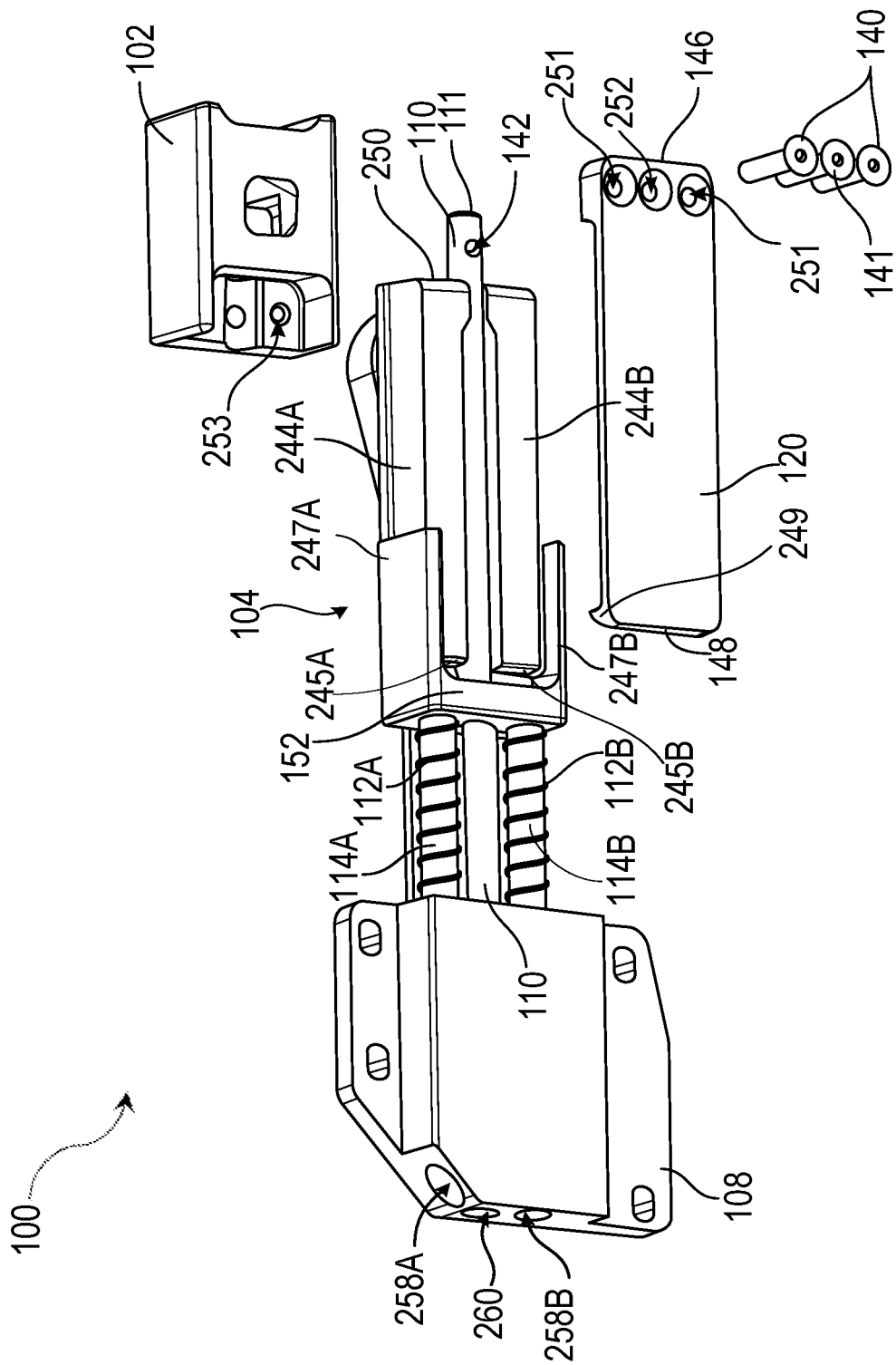
FIG. 2B shows a partially exploded perspective view of the connector depicted in FIGS. 1A-1D, according to certain embodiments.
Figure 2C:
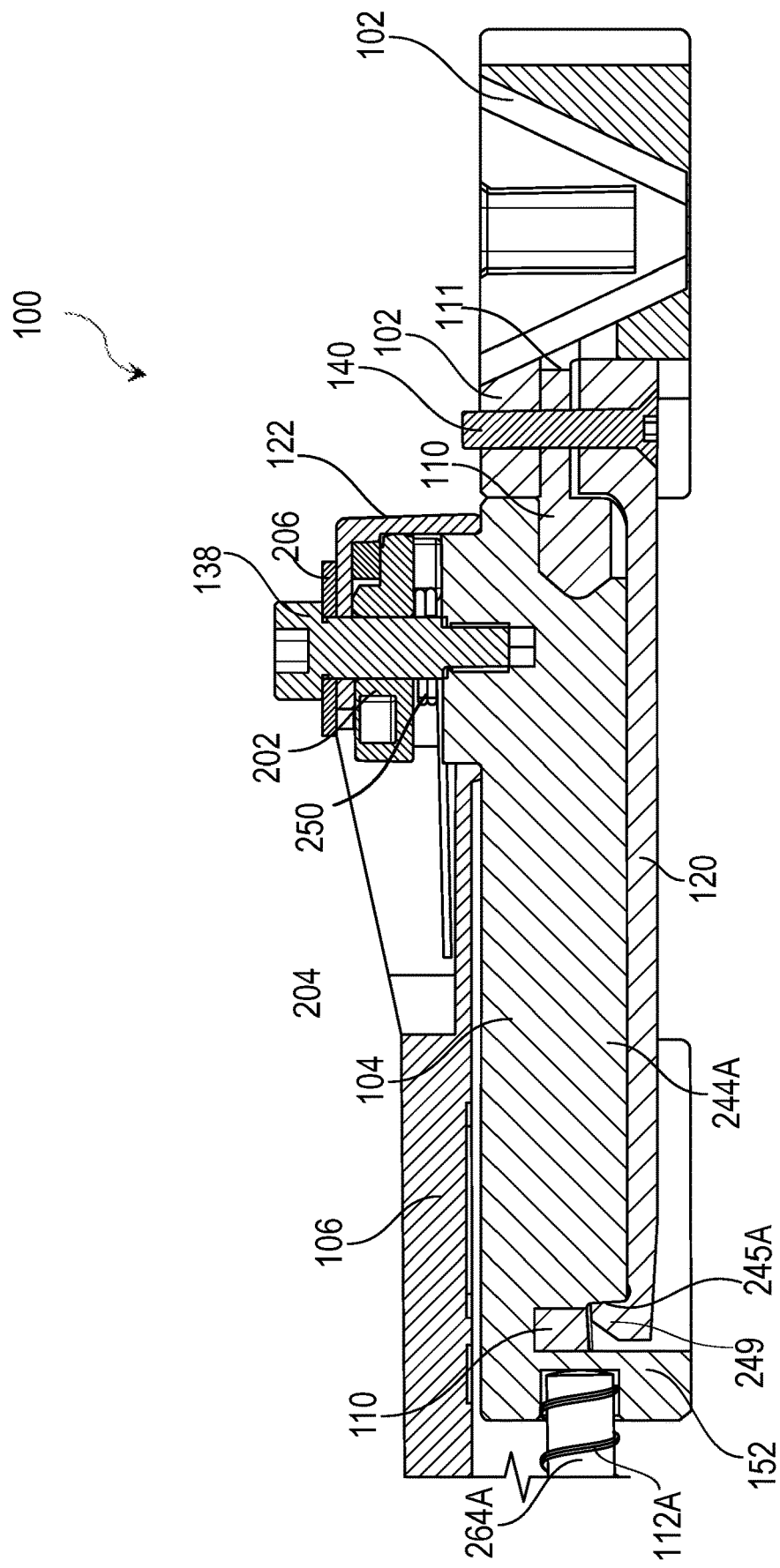
FIG. 2C shows a cross-sectional side view of a portion of the connector depicted in FIGS. 1A-1D by use of the section line 2C-2C in FIG. 1B, according to certain embodiments.

FIG. 2A shows an exploded view of the connector 100, according to certain embodiments. FIG. 2B shows a partially exploded bottom view of the connector 100 detailing the assembly of the shuttle block 104, the latch plate 120, the rod block 102, and the main rod 110, according to certain embodiments. FIG. 2C shows a side cross-sectional view of a portion of the connector 100 by use of the section line 2C-2C in FIG. 1B, according to certain embodiments. FIGS. 2A-2C are herein described together for clarity.

As shown in FIG. 2A, the connector 100 includes a reaction disk 202 and a torsion spring 204 disposed between the distal end 122 of the arm 106 and a mount 208 on the top surface 126 of the shuttle block 104. The mount 208 is disposed near a distal end 250 of the shuttle block 104 and configured to mate with a bottom surface of the reaction disk 202. The mount 208 is also configured to hold the torsion spring 204 such that the torsion spring 204 is disposed between the mount 208 and the reaction disk 202. As shown in FIG. 2C, the fastener 138 is threaded through a washer 206, the arm 106, the reaction disk 202, the torsion spring 204, and the shuttle block 104 when used to secure the arm 106 to the top surface 126 of the shuttle block 104.

As shown in FIG. 2A, each of the compression spring rods 114A, 114B, may comprise an interior rod 264A, 264B disposed within a rod sleeve 266A, 266B. The rod sleeves 266A, 266B may be configured to reduce friction and eliminate sliding noise between the compression springs 112A, 112B and the compression spring rods 114A, 114B extending therethrough when the connector 100 is in use. In some embodiments, the proximal end 152 of the shuttle block 104 includes a center opening 154 flanked by a pair of openings 156A, 156B. The center opening 154 may be configured to receive the main rod 110 to enable the main rod 110 to extend through the shuttle block 104 when the connector 100 is assembled. The openings 156A, 156B adjacent to the center opening 154 at the proximal end 152 of the shuttle block 104 may be configured to receive the distal ends of the compression springs 112A, 112B and the compression spring rods 114A, 114B extending between the shuttle block 104 and the track block 108. In such embodiments, the proximal ends of the compression springs 112A, 112B and compression spring rods 114A, 114B extending therethrough may be received by the track block 108.

In some embodiments, the openings 156A, 156B in the proximal end 152 of the shuttle block 104, for receiving the distal ends of the compression springs 112A, 112B and compression spring rods 114A, 114B, may be formed as cylindrical bores or recesses extending partially through the proximal end 152 of the shuttle block 104. The openings 156A, 156B may be sized to enable the distal ends of the compression spring rods 114A, 114B to be press-fitted into the openings 156A, 156B and secured to the proximal end 152 of the shuttle block 104. The openings 156A, 156B may also be sized to accommodate for the compressed height of the compression springs 112A, 112B when the connector 100 is actuated. As shown in FIG. 2C, the distal ends of compression spring 112A and compression spring rod 114A received by opening 156A may be in contact with an interior surface of the opening 156A in the proximal end 152 of the shuttle block 104 such that compression spring 112A and the compression spring rod 114A extend partially through the proximal end 152 of the shuttle block 104. Compression spring 112B and compression spring rod 114B, received by opening 156B, may similarly extend partially through the proximal end 152 of the shuttle block 104. The partial extension of the compression springs 112A, 112B in openings 156A, 156B of the shuttle block 104 enables the distal ends of the compression springs 112A, 112B to bank against the proximal end 152 of the shuttle block 104.

The track block 108 may correspondingly include a center opening 260 flanked by a pair of openings 258A, 258B for receiving the proximal ends of the main rod 110, compression springs 112A, 112B, and compression spring rods 114A, 114B. In some embodiments, the center opening 260 and pair of openings 258A, 258B formed at a distal end 147 of the track block 108 may extend at least partially through the track block 108. The center opening 260 may be configured to slidably receive the proximal end of the main rod 110. The openings 258A, 258B in the track block 108 may also be configured to slidably receive the proximal ends of the compression springs 112A, 112B and compression spring rods 114A, 114B extending therethrough, respectively.

The compression springs 112A, 112B and compression spring rods 114A, 114B may therefore extend between the openings 258A, 258B in the track block 108 and the openings 156A, 156B in the shuttle block 104 when the connector 100 is assembled. When the connector 100 is in use, such that the shuttle block 104 is pushed towards the track block 108 due to the distal ends of the compression springs 112A, 112B and compression spring rods 114A, 114B being affixed to the proximal end 152 of the shuttle block 104, the main rod 110 and compression spring rods 114A, 114B may, in turn, each slide within their respective openings in the track block 108 to accommodate for the decreasing distance between the proximal end 152 of the shuttle block 104 and a distal end 147 of the track block 108.

As shown in FIGS. 2A and 2B, the shuttle block 104 includes a pair of proximal side walls 247A, 247B extending from the proximal end 152 of the shuttle block 104. The proximal side walls 247A, 247B extend across a portion of the shuttle block 104 towards the distal end 250 of the shuttle block 104. The shuttle block 104 also includes a pair of distal side walls 244A, 244B extending from the distal end 250 of the shuttle block 104 towards the proximal end 152 of the shuttle block 104. As shown in FIG. 2B, in some embodiments, the distal side walls 244A, 244B may extend between the proximal side walls 247A, 247B on opposite sides of the shuttle block 104. In other embodiments, the proximal side walls 247A, 247B and distal side walls 244A, 244B may be flush with one another or formed together as a unitary sidewall on the shuttle block 104.

Again, the latch plate 120 may be fastened to the rod block 102 by threading two fasteners 140 through the two bores 251 at the distal end 146 of the latch plate 146 and into two corresponding bores 253 in the rod block 102. The rod block 102 may then be aligned with the shuttle block 104 by fastening the latch plate 120 to a distal end 111 of the main rod 110, which extends through the shuttle block 104. The distal end 111 of the main rod 110 may be secured to the latch plate 120 by threading the fastener 141 through the center bore 252 at the distal end 146 of the latch plate 120 and into a bore 142 at a distal end 111 of the main rod 110. To align the shuttle block 104 and the rod block 102 with the track block 108, the center opening 154 at the proximal end 152 of the shuttle block 104 may be aligned with the center opening 260 at the distal end 147 of the track block 108 such that the main rod 110, which extends from the center opening 260 in the track block 108 to the rod block 102, maybe be inserted through the center opening 154 at the proximal end 152 of the shuttle block 104.

The proximal end 148 of the latch plate 120 includes a lipped edge 249 configured to removably engage the latch plate 120 with a proximal end 245A, 245B of each of the distal side walls 244A, 244B of the shuttle block 104. As shown in FIG. 2C, the lipped edge 249 may removably couple the latch plate 120 to the shuttle block 104 by engaging with the proximal ends 245A, 245B of the distal side walls 244A, 244B. When the lipped edge 249 is engaged to the proximal ends 245A, 245B of the distal side walls 244A, 244B, the lipped edge 249 of the latch plate 120 is disposed between the proximal ends 245A, 245B of the distal side walls 244A, 244B and the proximal end 152 of the shuttle block 104, and the latch plate 120 may extend substantially parallel to and in contact with a bottom surface of the distal side walls 244A, 244B. As shown in FIG. 1C, when the lipped edge 249 is engaged to the proximal ends 245A, 245B of the distal side walls 244A, 244B, the latch plate 120 may also be disposed between the proximal side walls 247A, 247B of the shuttle block 104.

Generally, the latch plate 120 may function to restrain the shuttle block 104 relative to the rod block 102 during normal functioning of the connector 100. In certain embodiments, the latch plate 120 may also impose a maximum tension loading to protect the connector 100. In certain embodiments, the latch plate 120 may be configured to deflect, or bend, such that the lipped edge 249 disengages from the proximal ends 245A, 245B of the distal side walls 244A, 244B of the shuttle block 104 when excessive tensile force or loading greater than a maximum tensile load is applied to the connector 100. The disengagement of the latch plate 120 from the shuttle block 104 enables the rod block 102 to temporarily detach from the shuttle block 104 and prevent the connector 100 from being damaged. When the latch plate 120 deflects, the latch plate 120 may react against the main rod 110 while the shuttle block 104 serves as the medium of the deflection.

In some embodiments, the fastener 141 coupling the latch plate 120 to the main rod 110 may be configured to provide a solid surface-to-surface coupling between the latch plate 120 and the main rod 110. The solid surface-to-surface coupling provides additional support for the reaction of the latch plate 120 against the main rod 110 during such deflection. If the rod block 102 becomes separated from the shuttle block 104 due to the detachment of the latch plate 120, proper functioning of the connector 100 may temporarily cease. However, use of the connector 100 may be restored by reengaging the lipped edge 249 of the latch plate 120 to the proximal ends 245A, 245B of the distal side walls 244A, 244B of the shuttle block 104, thereby reconnecting the latch plate 120 and the rod block 102 to the shuttle block 104.

Figure 3:
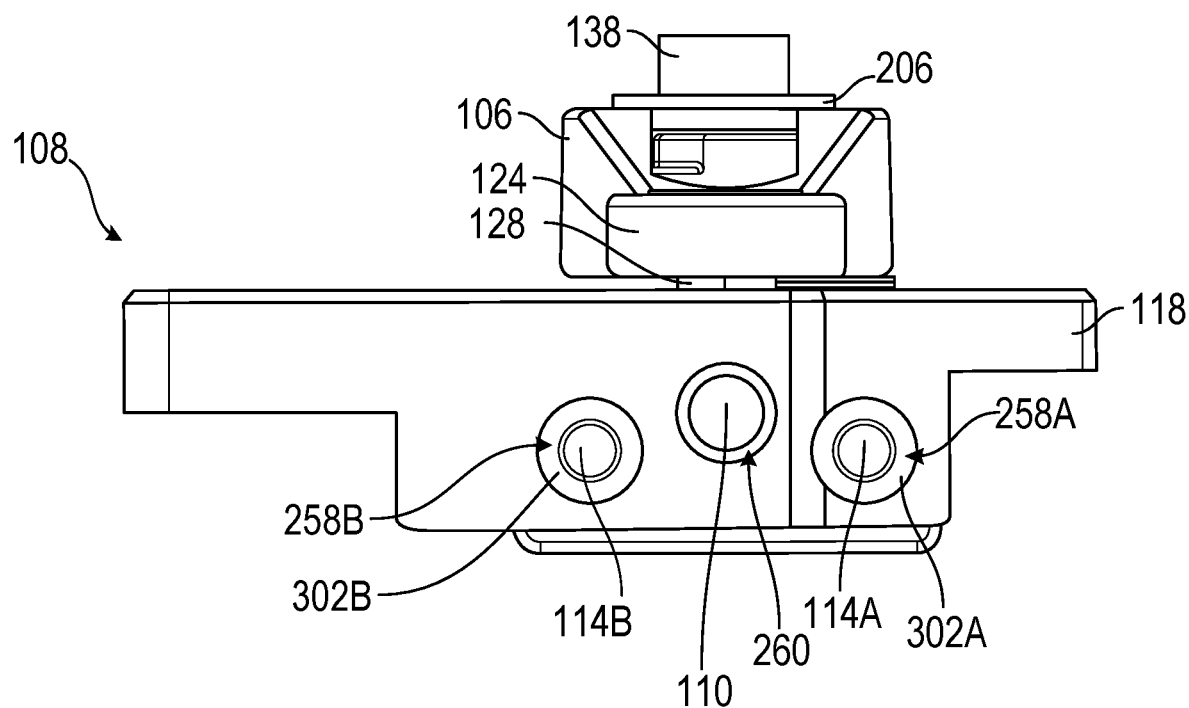
FIG. 3 shows an end view of the proximal end of the connector depicted in FIGS. 1A-1D, according to certain embodiments.

FIG. 3 shows an end view of the proximal end 118 of the connector 100 depicted in FIGS. 1A-1D, according to certain embodiments. In some embodiments, the openings 258A, 258B may extend completely through the track block 108 and may each include an annular flange 302A, 302B extending from an interior surface of the openings 258A, 258B in the track block 108. The annular flanges 302A, 302B bordering along an interior circumference of the openings 258A, 258B may each be formed with an opening concentric with the openings 258A, 258B. The openings in the annular flanges 302A, 302B may each include a diameter sized to be smaller than a width of each of the compression springs 112A, 112B. The annular flanges 302A, 302B may therefore enable the corresponding proximal ends of the compression springs 112A, 112B to react and bank against the annular flanges 302A, 302B in the track block 108 when the connector 100 is assembled.

The compression springs 112A, 122B may therefore extend between and bank against the annular flanges 302A, 302B in the track block 108 and the interior surface of the openings 156A, 156B at the proximal end 152 of the shuttle block 104 to generate the linear preload force between the track block 108 and the shuttle block 104. The annular flanges 302A, 302B may also be formed and positioned within the openings 258A, 258B of the track block 108 to accommodate for the sliding movement of the proximal ends of compression spring rods 114A, 114B in track block 108 when the shuttle block 104 is pushed towards the track block 108 during use of the connector 100 to transition the connector 100 between its latched and unlatched states.

As mentioned above, when the connector 100 is assembled and actuated, since the distal ends of the compression spring rods 114A, 114B are affixed to the proximal end 152 of the shuttle block 104, the proximal ends of compression spring rods 114A, 114B may slide within the openings 258A, 258B of the track block 108 as the space between the shuttle block 104 and the track block 108 changes. In some embodiments, the proximal ends of compression spring rods 114A, 114B may slide between a distal position and a proximal position in the openings 258A, 258B of the track block 108 when the connector 100 transitions between the unlatched state and the latched state, respectively. When the connector 100 is in the unlatched state, the proximal ends of the compression spring rods 114A, 114B may be in the distal position which is closer to the distal end 147 of the track block 108 as compared to the proximal position.

When the connector 100 is actuated to transition the connector 100 to the latched state, the shuttle block 104 is pushed towards the track block 108, which in turn causes the compression spring rods 114A, 114B extending from and affixed to the proximal end 152 of the shuttle block 104 to be pushed towards the track block 108. As the compression spring rods 114A, 114B are pushed towards the track block 108, the proximal ends of the compression spring rods 114A, 114B slide from the distal position toward the proximal position, which is farther from the distal end 147 of the track block 108 as compared to the distal position, to accommodate for the decreasing space between the shuttle block 104 and track block 108. When the proximal ends of the compression spring rods 114A, 114B slide to the distal position, the compression spring rods 114A, 114B may also slide toward the annular flanges 302A, 302B. When the connector 100 is transitioned back to the unlatched state, the proximal ends of the compression spring rods 114A, 114B slide back the distal position towards the distal end 147 of the track block 108 and away from the annular flanges 302A, 302B.

Figure 4:
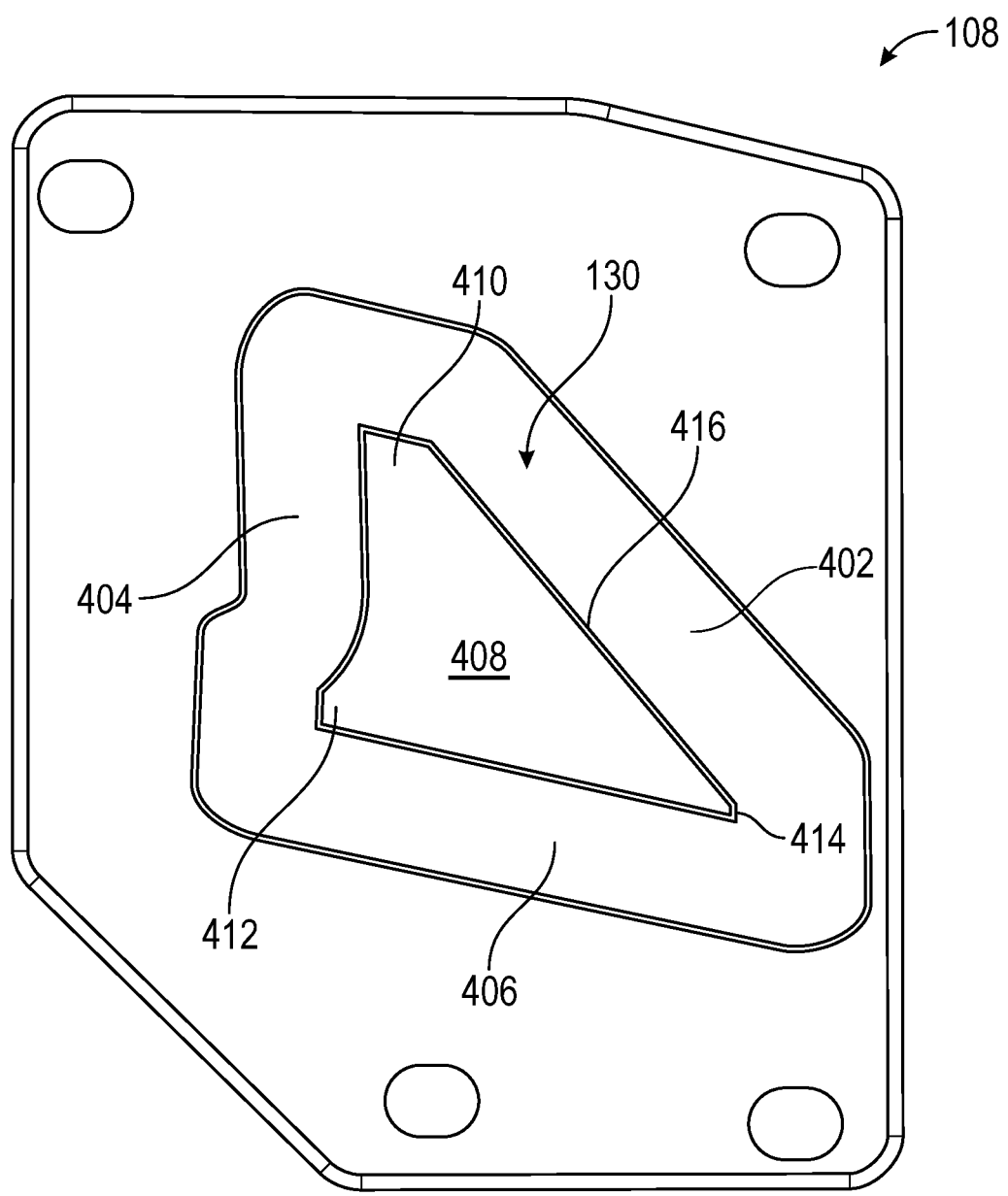
FIG. 4 shows a top view of an exemplary track block from the connector depicted in FIGS. 1A-1D, according to certain embodiments.

FIG. 4 shows a top view of the track block 108 from the connector 100 depicted in FIGS. 1A-1D, according to certain embodiments. In some embodiments, the recessed track 130 includes a first segment 402, a second segment 404, and a third segment 406 connected together which gives the recessed track 130 a generally triangular shape. The first, second, and third segments 402, 404, 406 therefore border and define a central and generally triangular-shaped raised surface 408 in the track block 108 having a first corner 410, a second corner 412, and a third corner 414. The first segment 402 connects to the second segment 404 at the first corner 410, the second segment 404 connects to the third segment 406 at the second corner 412, and the third segment 406 connects back to the first segment 402 at the third corner 414. The raised surface 408 includes a side wall 416 bordering each of the first, second, and third segments 402, 404, 406. The first second, and third segments 402, 404, 406 define a path that the dowel pin 128 travels as the connector 100 is actuated and transitions between the latched and unlatched states.

When the dowel pin 128 is on the first segment 402 and a push force is applied, the dowel pin 128 will move and progress towards the first corner 410. When the dowel pin 128 is on the second segment 404 upon push force being applied, the dowel pin 128 will move and progress towards the second corner 412. When the dowel pin 128 is moved from the second segment 404 to the third segment 406, a mechanically-generated preload force created by a combination of the extending force applied by the compressed compression springs 112A, 112B and a torsional preload force applied by the torsion spring 204 to the arm 106 will cause the dowel pin 128 to automatically move along the third segment 406 towards and around the third corner 414 to the first segment 402. The first, second, and third corners 410, 412, 414 define points along the recessed track 130 at which the motion of the dowel pin 128 (and the arm 106 connected thereto) jumps abruptly and irreversibly between two stable states.

Figure 5A:
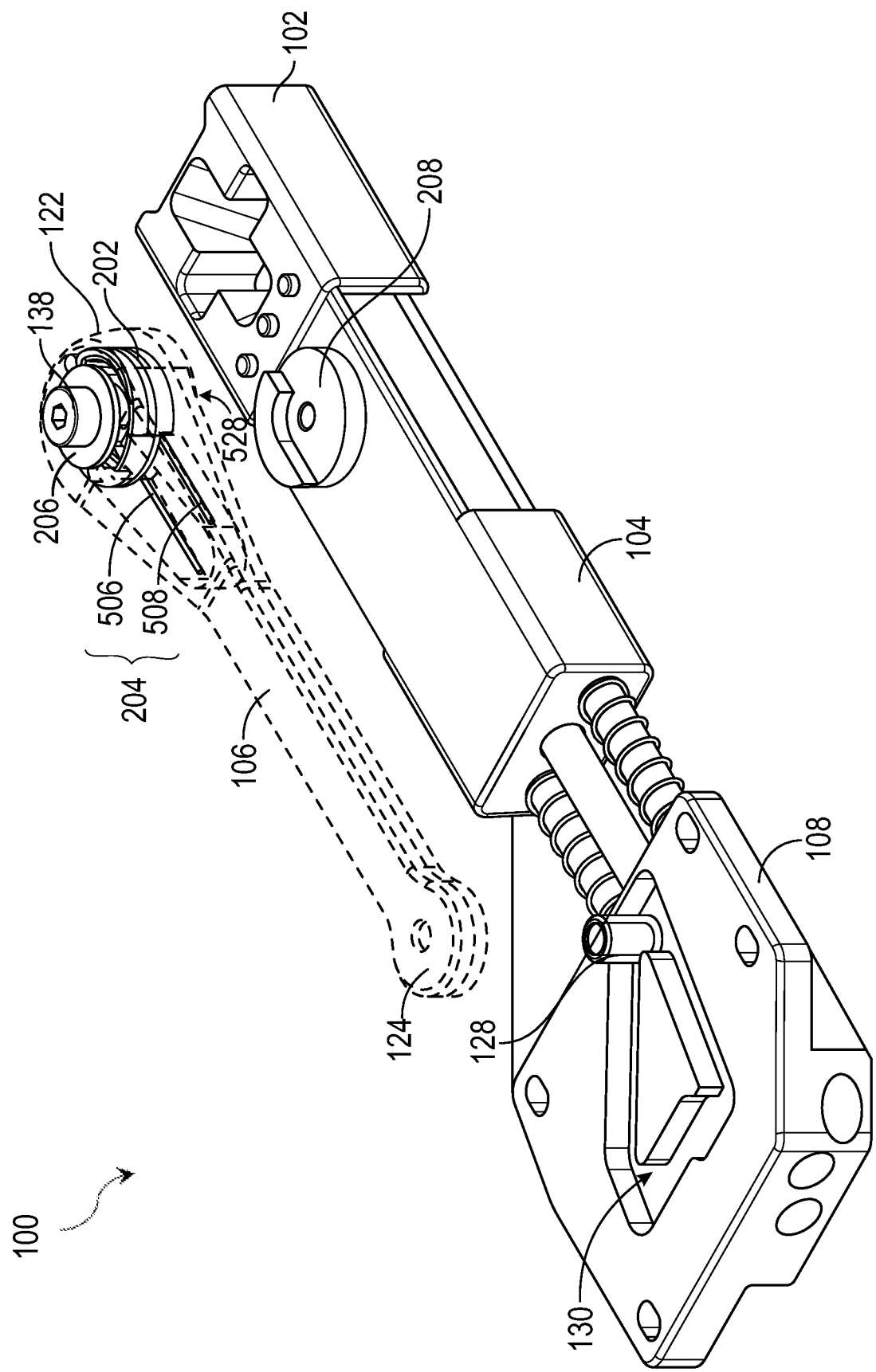
FIG. 5A shows a partially exploded perspective view of the connector depicted in FIGS. 1A-1D with the arm depicted in phantom, according to certain embodiments.
Figure 5B:
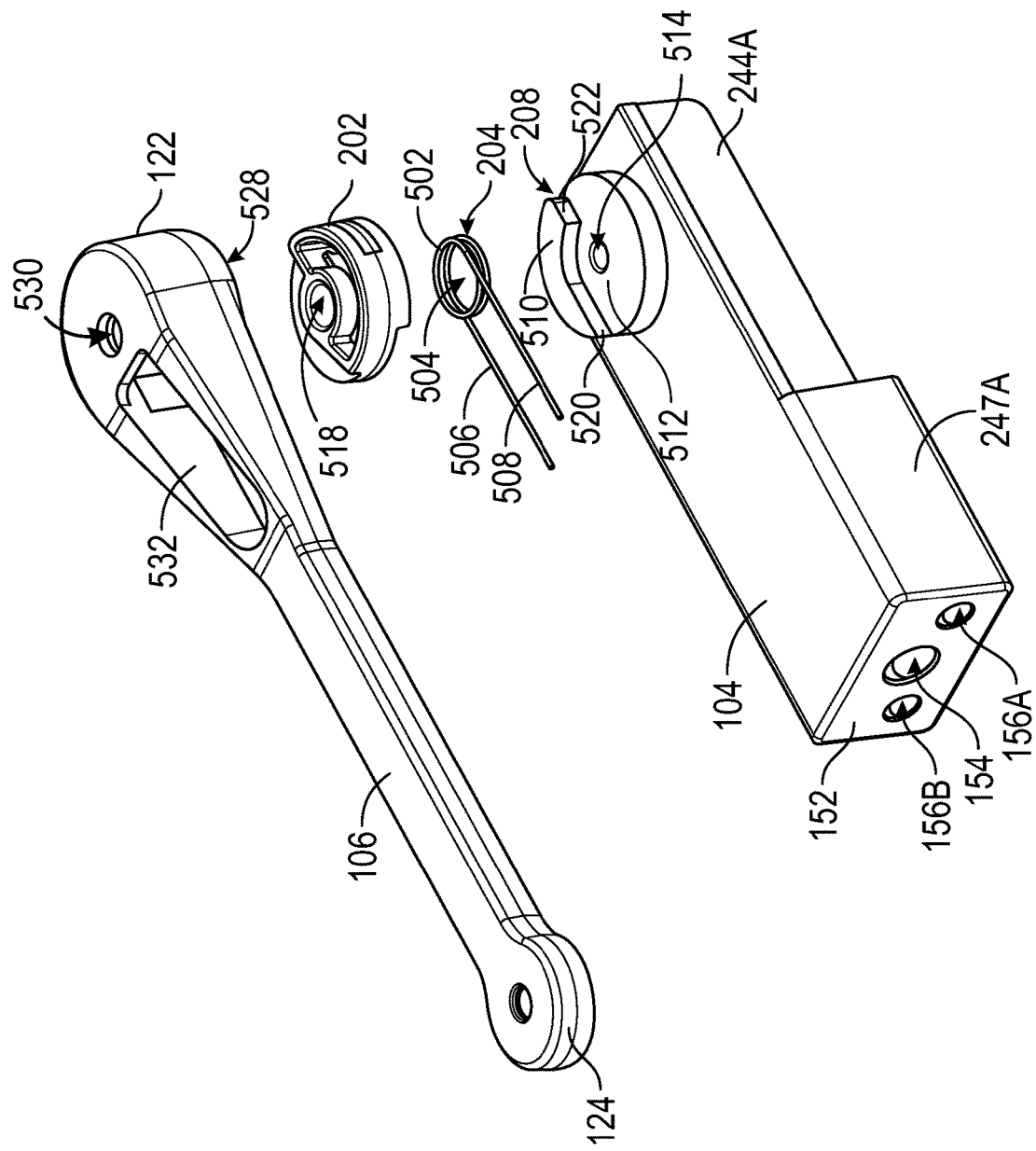
FIG. 5B shows an exploded detailed view of a portion of the connector depicted in FIGS. 1A-1D, according to certain embodiments.
Figure 6B:
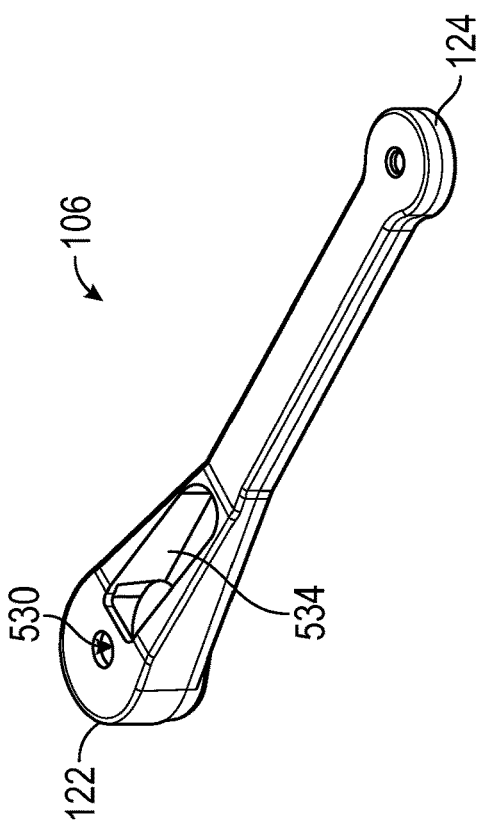
FIG. 6B shows a perspective view of an exemplary arm from the connector depicted in FIGS. 1A-1D, according to certain embodiments.
Figure 6A:
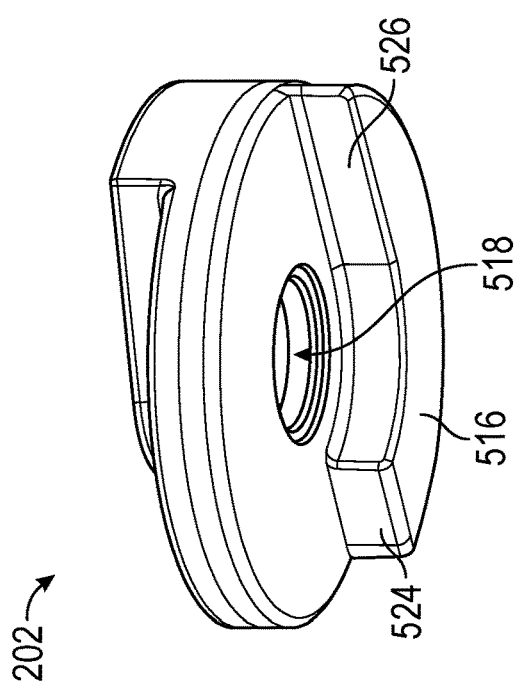
FIG. 6A shows a perspective view of an exemplary reaction disk from the connector depicted in FIGS. 1A-1D, according to certain embodiments.

FIG. 5A shows a perspective view of the connector 100 partially exploded and with the arm 106 in phantom, according to certain embodiments. FIG. 5B shows a closer and exploded view of a portion of the connector 100, specifically, the coupling of the arm 106 to the shuttle block 104, according to certain embodiments. FIGS. 6A and 6B show additional perspective views of the reaction disk 202 and arm 106, respectively, according to certain embodiments. FIGS. 5A-5B and 6A-6B are herein described together where appropriate for clarity.

As shown, the torsion spring 204 is coupled to the reaction disk 202 and disposed between the arm 106 and mount 208 when the connector 100 is assembled. The torsion spring 204 includes a coil 502 having an opening 504, a first arm 506 and a second arm 508. The mount 208 includes a curved feature 510 formed on a base 512 of the mount 208 and adjacent to an opening 514. The opening 514 is configured to receive fastener 138 for securing the arm 106 to the shuttle block 104. The curved feature 510 may be configured to mate with a curved feature 516 on a bottom side of the reaction disk 202 adjacent to an opening 518 (shown in FIG. 6A). The curved feature 510 on the mount 208 includes a surface 520 and a surface 522. The surface 522 is configured to contact a surface 524 on the curved feature 516 when the reaction disk 202 is disposed on the base 512 of the mount 208. When the reaction disk 202 is disposed on the mount 208, the opening 518 in the reaction disk 202 aligns with the opening 514 in mount 208 such that a surface 526 on the curved feature 516 of the reaction disk 202 extends across from and faces the surface 520 of curved feature 510 in mount 208. With the reaction disk 202 assembled on the base 512 of the mount 208, the torsion spring 204 may be cradled between the curved feature 510 of the mount 208 and the curved feature 516 of the reaction disk 202 with the opening 504 in the coil 502 of the torsion spring 204 also aligned with the opening 514 in the mount 208 and the opening 518 in the reaction disk 202. When the torsion spring 204 is disposed between the curved feature 510 and the curved feature 516, a portion of the first arm 506 of the torsion spring 204 may be in contact with the surface 520 on the curved feature 510 of the mount 208, and a portion of the second arm 508 of the torsion spring 204 may be in contact with the surface 526 on the curved feature 516 of the reaction disk 202.

In certain embodiments, as shown in FIGS. 5A and 5B, the distal end 122 of the arm 106 may comprise an enclosure having a cavity 528 configured to enclose the reaction disk 202, torsion spring 204, and mount 208 when the arm 106 is coupled to the shuttle block 104. The housing at the distal end 122 of the arm 106 also includes an opening 530 for receiving the fastener 138. The opening 530 is configured to align with the opening 518 in the reaction disk 202, opening 504 in the torsion spring 204, and opening 514 in the mount 208 when affixing the arm 106 to the shuttle block 104 with the fastener 138.

In certain embodiments, the distal end 122 of the arm 106 may also include a first tapered surface 532 (shown in FIG. 5B) and a second tapered surface 534 (shown in FIG. 6B) extending from the enclosure at the distal end 122 of the arm 106 towards the proximal end 124 of the arm 106. The first tapered surface 532 may be opposite from and face the second tapered surface 534 such that a gap in fluid communication with the cavity 528 at the distal end 122 of the arm 106 is formed between the first and second tapered surfaces 532, 534 to receive the first and second arms 506, 508 of the torsion spring 204. When the arm 106 is assembled with the shuttle block 104 such that the torsion spring 204 is positioned within the cavity 528 of the arm 106, a portion of the first arm 506 contacts the first tapered surface 532 and a portion of the second arm 508 contacts the second tapered surface 534. The contacting of the first and second arms 506, 508 of the torsion spring 204 with the first and second tapered surfaces 532, 534 of the arm 106 enables the torsion spring 204 to apply torsional preload force against the arm 106 when the arm 106 rotates.

Referring to FIG. 5A, when the arm 106, reaction disk 202, and torsion spring 204 are assembled in the enclosure of the arm 106, and the arm 106 is in a neutral angular position (shown in FIG. 5A) and disposed on the mount 208 (shown in FIG. 1A), a portion of the first arm 506 of the torsion spring 204 adjacent to the coil 502 banks against the surface 520 on the curved feature 510 of the mount 208, and another portion of the first arm 506 adjacent the end of the first arm 506 banks against the first tapered surface 532 of the arm 106. Correspondingly, a portion of the second arm 508 of the torsion spring 204 near the coil 502 banks against the surface 526 on the curved feature 516 of the reaction disk 202 and another portion of the second arm 508 near the end of the second arm 508 banks against the second tapered surface 534 of the arm 106. The banking of the second arm 508 against the surface 526 of the reaction disk 202 applies a rotational force against the reaction disk 202, which in turn causes the surface 524 of the reaction disk 202 to bank against the surface 522 of the mount 208. The banking by both the first and second arms 506, 508 of the torsion spring 204 when the arm 106 is in its neutral angular position enables the arm 106 to be preloaded in both directions relative to the neutral angular position. In this example, using the torsion spring 204 to generate the preload on the arm 106, rather than deflection of the arm 106 itself, may permit the arm 106 to be relatively strong and rigid and may enhance the robustness of the connector 100 with respect to tension loading. The torsional preload force applied by the torsion spring 204 on the arm 106 may also cause the dowel pin 128 extending from the proximal end 124 of the arm 106 to be pressed against the side wall 416 of the raised surface 408, thus eliminating any looseness in the "feel" of the connector 100 when assembled thereby also contributing to the robustness of the connector 100.

FIGS. 7A-7F show a perspective view of the connector 100 in operation when a push force is applied to the rod block 102, according to certain embodiments. FIGS. 8A-8F show corresponding views of the position and movement of the dowel pin 128 on the track block 108 when the connector 100 is in operation as depicted in FIGS. 7A-7F, according to certain embodiments. As used herein, reference to the connector 100 being in an unlatched state corresponds with the connector 100 being in a first stable state and the rod block 102 extended from the track block 108 and at a maximum distance from the track block 108 allowed by the connector 100. Reference to the connector 100 being in a latched state corresponds to the connector 100 being in a second stable state and the rod block 102 retracted towards to the track block 108 and at a closer position to the track block 108 as compared to when the connector 100 is in the unlatched state.

As mentioned above, when the connector 100 is assembled, the distal end 122 of the arm 106 is coupled to the shuttle block 104 via the fastener 138 with which the arm 106 may then rotate about. When a push force parallel to a longitudinal axis of the main rod 110 and the X axis is applied by a user against the rod block 102 in a direction toward the track block 108, the push force simultaneously pushes the distal end 122 of the arm 106 coupled to the shuttle block 104 towards the track block 108. The push force causes the dowel pin 128 coupled to the proximal end 124 of the arm 106 to translate in the recessed track 130 and bank against the side wall 416 of the recessed track 130. In some embodiments, as the rod block 102 (and the connected shuttle block 104) moves towards the track block 108 in response to the push force applied, the movement of the shuttle block 104 causes the distal end 122 of the arm 106 to rotate and the dowel pin 128 to slide against the side wall 416 and progress in a counter-clockwise manner around the recessed track 130 in the track block 108.

Figure 7A:
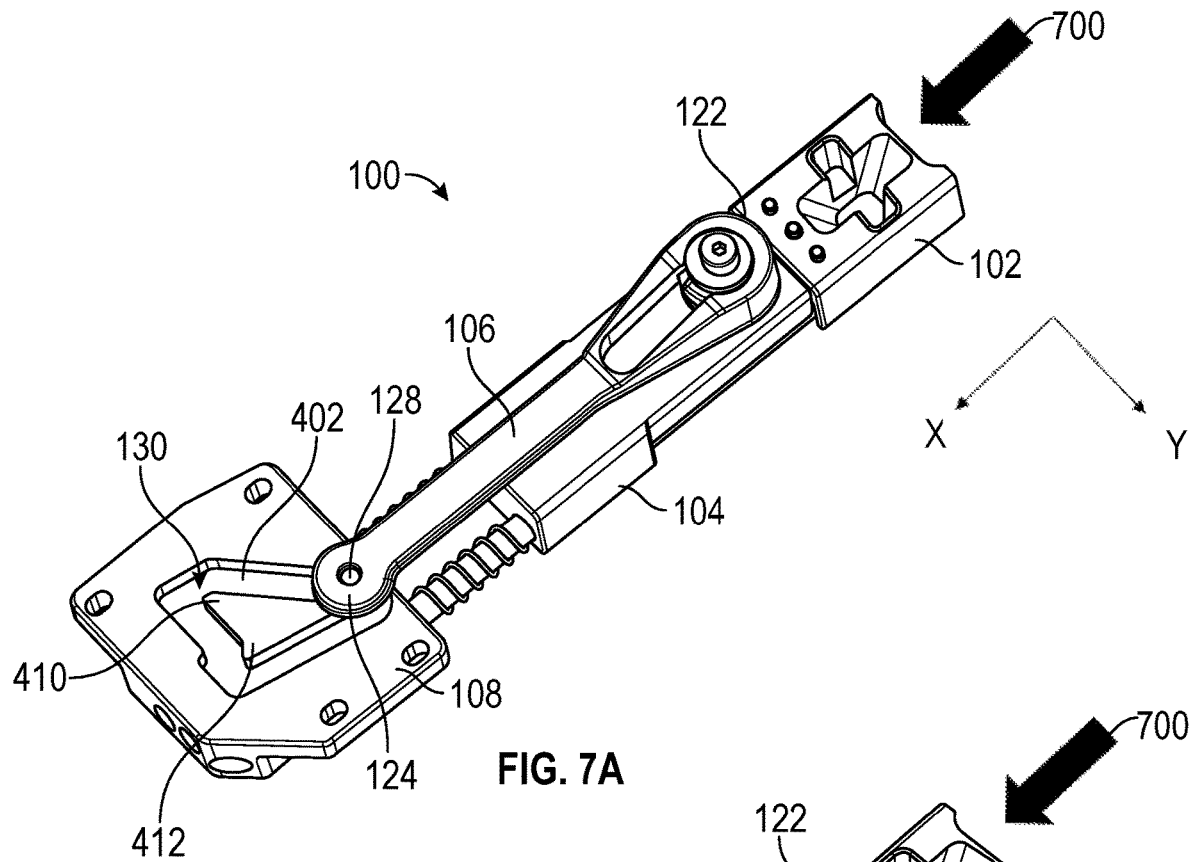
FIGS. 7A-7F show perspective views of the connector depicted in FIGS. 1A-1D during operation, according to certain embodiments.

FIG. 7A illustrates the connector 100 in an unlatched state wherein the connector 100 is in a resting position and ready to be actuated. As applied to the shroud example previously discussed above, when the connector 100 is in the resting position shown in FIG. 7A, the shroud may be extended and available for use. In the example shown, the arm 106 is in the neutral angular position discussed above with a slight preload force applied by the torsion spring 204 against the arm 106. As shown in corresponding FIG. 8A, the dowel pin 128 extending from the proximal end 124 of the arm 106 is on the first segment 402 and adjacent to the third corner 414. In the instant first stable state, the dowel pin 128 is also banked against the side wall 416 of the raised surface 308 due to the torsional preload force. To actuate the connector 100 and retract the rod block 102 towards the track block 108, the rod block 102 may be pushed towards the track block 108. In the example shown, a push force 700 is applied to push the rod block 102 (and shuttle block 104 connected thereto) towards the track block 108.

Figure 7B:
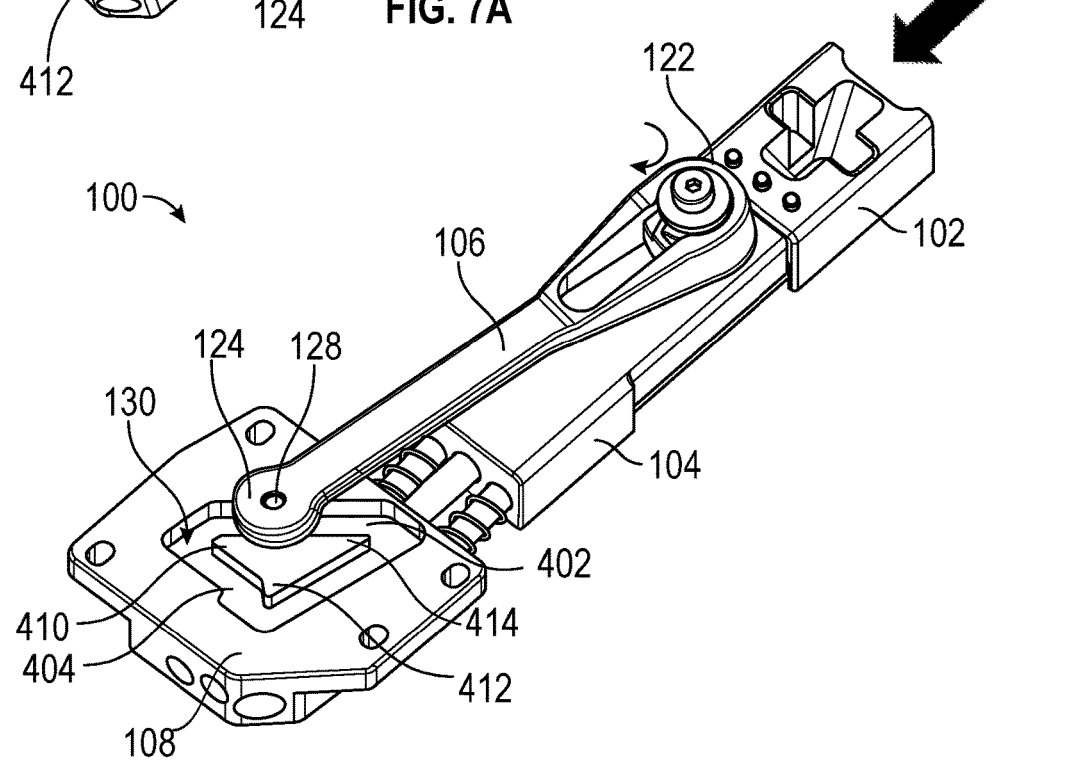

Turning to FIGS. 7B and 8B, as the shuttle block 104 is pushed towards the track block 108, in some embodiments, the distal end 122 of the arm 106 rotates clockwise relative to the neutral angular position about the shuttle block 104, and the proximal end 124 of the arm 106 begins to translate around the recessed track 130 in the track block 108. In other embodiments, the connector 100 may alternatively be configured to be a mirror image of the example shown, such that the arm 106 instead rotates counter-clockwise relative to the neutral angular position about the shuttle block 104 as the shuttle block 104 is pushed towards the track block 108. When the push force 700 is applied with the connector 100 in the unlatched state shown in FIG. 1A, the dowel pin 128 begins to slide across the first segment 402 from the third corner 414 towards the first corner 410. As the dowel pin 128 slides across the first segment 402, the rotation of the distal end 122 of the arm 106 causes the arm 106 to gradually be further preloaded until the dowel pin 128 slides over the first corner 410 to the second stable state on the second segment 404. Specifically, in the corresponding rotation of the arm 106 when the dowel pin 128 slides across the first segment 402 towards the first corner 410, the second tapered surface 534 of the arm 106 may further press against the banked second arm 508 of the torsion spring 204 while the first arm 506 of the torsion spring 204 continues to be banked against the surface 520 of the mount 208. The rotation of the arm 106 may therefore cause the torsional preload already present on the arm 106 to increase. The extent of the movement of the dowel pin 128 across the first segment 402 may therefore correspond directly with the push force 700 applied. Specifically, the push force 700 must therefore be sufficiently greater than the parallel component of the increasing torsional preload force applied against the arm 106, as well as the increasing linear preload force due to the compression springs 112A, 112B, to enable the shuttle block 104 to be pushed towards the track block 108, the arm 106 to further rotate, and the dowel pin 128 to move further along the first segment 402 towards the first corner 410.

Figure 7C:
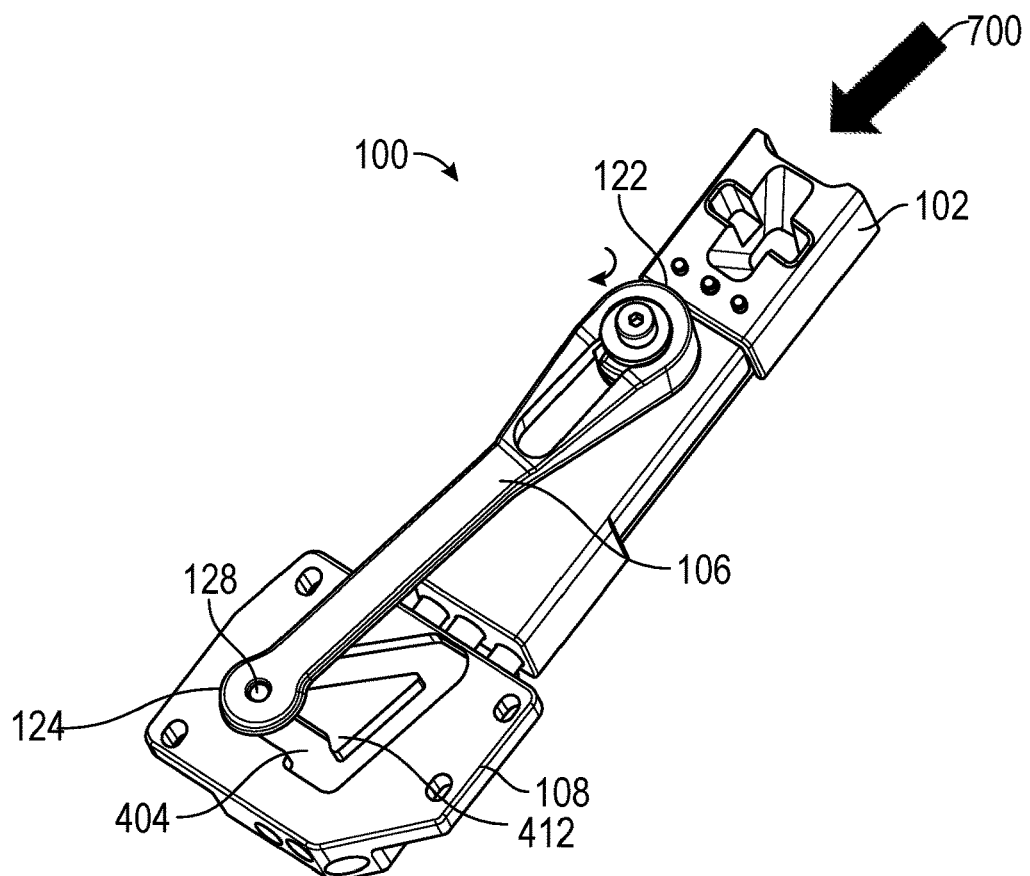

If the push force 700 is not great enough to move the dowel pin 128 over the first corner 410 to the second segment 404 (as shown in FIGS. 7C and 8C), the combination of the parallel component of the torsional preload force due to the torsion spring 204 and the linear preload force due to the compression springs 112A, 122B may move the dowel pin 128 back to the previous stable state (the resting position) on the first segment 402 adjacent to the third corner 414 (as shown in FIGS. 7A and 8A) after the push force 700 is removed.

Figure 7D:
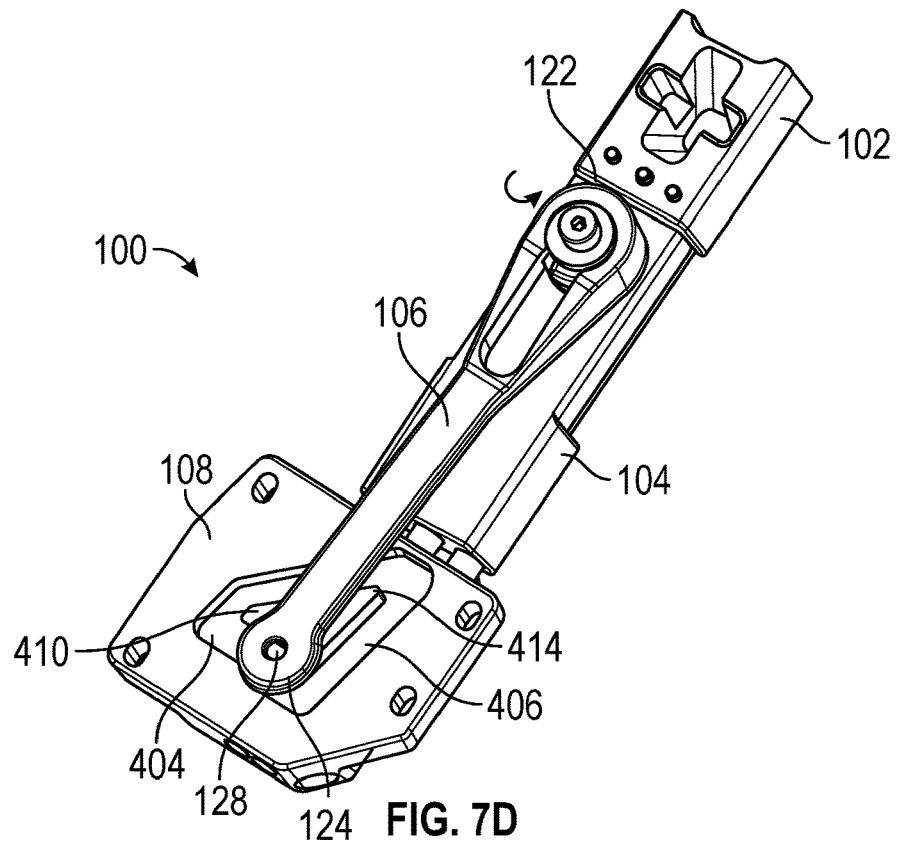

However, if the push force 700 is great enough to move the dowel pin 128 around the first corner 410 and on to the second segment 404, the connector 100 transitions from the unlatched state shown in FIGS. 7A, 7B, and 7C to the latched state depicted in FIG. 7D. Once the dowel pin 128 slides past the first corner 410 and the push force 700 is removed, the torsional preload force from the torsion spring 204 will cause the dowel pin 128 to slide along the second segment 404 towards the second corner 412. The sliding of the dowel pin 128 along the second segment 404 towards the second corner 412 may correspond with the distal end 122 of the arm 106 rotating back towards the neutral angular position. As the dowel pin 128 slides across the second segment 404, the torsional preload force built up from when the dowel pin 128 reached the first corner 410 may also decrease. Although the torsional preload force decreases in response to the opposite rotation of the arm 106 and the movement of the dowel pin 128 along the second segment 404, some of the torsional preload force on the arm 106 remains to bank the dowel pin 128 against the second corner 412.

As mentioned above, applying the push force 700 may transition the connector 100 from the unlatched state depicted in FIG. 7A to the latched state as shown in FIG. 7D.

In the positions shown in FIGS. 7D and 8D. When the connector 100 is in the latched state, the rod block 102 is retracted towards the track block 108. As applied to the shroud example previously discussed above, when the connector 100 is in the position shown in FIG. 7D, the shroud may be retracted for stowage or charging. When the connector 100 is in the latched state with the dowel pin 128 adjacent the second corner 412 as shown in FIG. 8D, the connector 100 is in the second stable state and may necessarily be subject to an indefinite amount of tension loading due to the need for the connector 100 to move freely back toward the resting position (as shown in FIGS. 7A and 8A) after the connector 100 is unlatched.

Figure 7E:
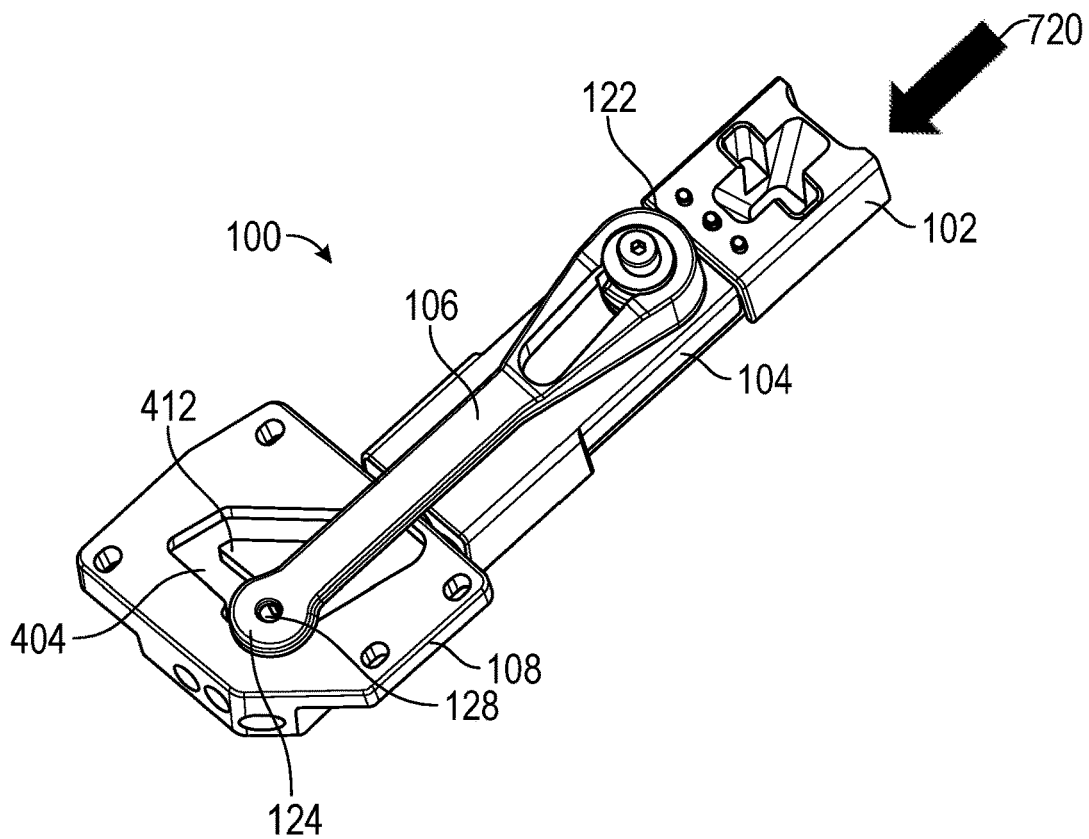

Turning to FIGS. 7E and 8E, the connector 100 may be unlatched by a second push force 720 applied against the rod block 102 towards the track block 108. When the second push force 720 is applied, the angles of the second segment 404 and the second corner 412 coupled with the torsional preload force direct the dowel pin 128 to slide over the second corner 412 towards the third segment 406. The applied second push force 720 must therefore also be sufficiently great enough to cause the dowel pin 128 to slide over the second corner 412 onto the third segment 406 to unlatch the connector 100. When the dowel pin 128 is pushed over the second corner 412, the connector 100 may become unlatched and start to transition to the resting position and unlatched state. Once the connector 100 is unlatched by the push force 720 as shown in FIG. 7E, the connector 100 will begin to travel down the third segment 406 towards the resting position after the second push force 720 is released. Once the second push force 720 is released, the dowel pin 128 will start to automatically move along the third segment 406 as the connector 100 transitions back towards the first stable state (the resting position) shown in FIG. 7A.

Figure 7F:
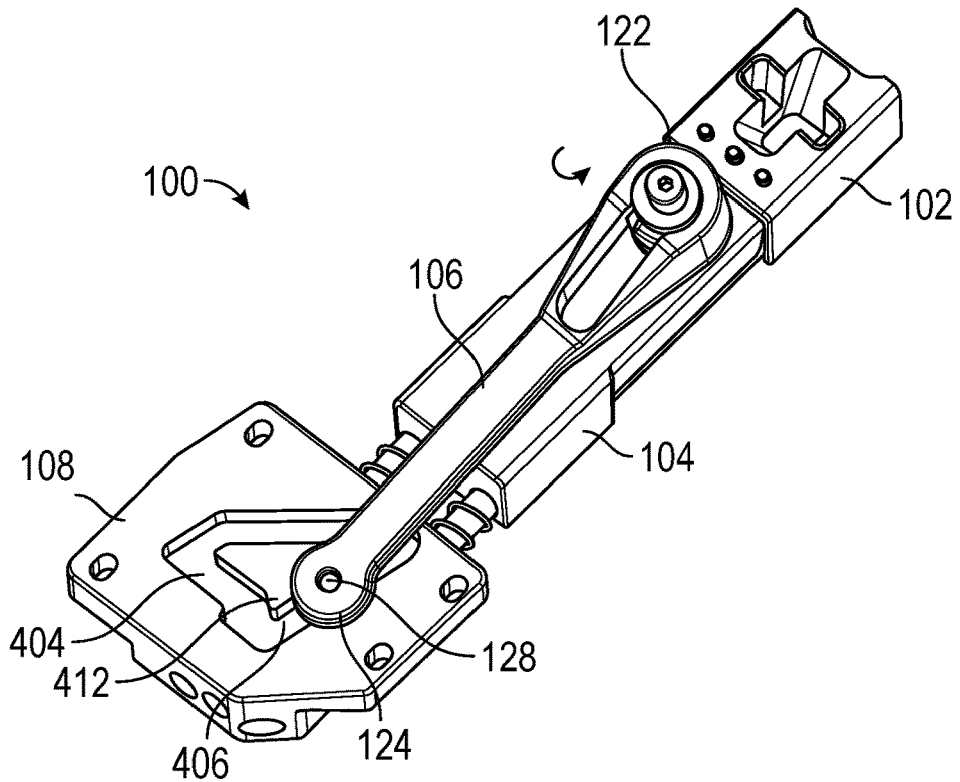

Turning to FIGS. 7F and 8F, when the second push force 720 is released, the torsional force due to the torsion spring 204 may automatically move the dowel pin 128 along the third segment 406 from the second corner 412 towards the third corner 414. The movement of the dowel pin 128 along the third segment 406 corresponds with the extension and movement of the rod block 102 (and the shuttle block 104 connected thereto) away from the track block 108. The sliding of the dowel pin 128 along the third segment 406 towards the third corner 414 may also correspond with the arm 106 rotating counter-clockwise relative to the neutral angular position. When the arm 106 rotates counter-clockwise, the first tapered surface 532 on the arm 106 may press against the first arm 506 of the torsion spring 204 thereby causing the second arm 508 to bank against surface 526 of the reaction disk 202. The banking of the second arm 508 against the surface 526 of the reaction disk 202 applies a rotational force against the reaction disk 202 which in turn also causes the surface 524 of the reaction disk 202 to further bank against the surface 522 of the mount 208. The rotation of the arm 106 may therefore cause the torsional preload already present on the arm 106 to further increase as the dowel pin 128 is moved towards the third corner 414.

When the dowel pin 128 reaches the end of the third segment 406 near the third corner 414, the increased torsional preload force built up from the counter-clockwise rotation of the arm 106 while the dowel pin 128 traveled across the third segment 406 may then cause the dowel pin 128 to slide around the third corner 414 to rotate the arm 106 back to the neutral angular position. When the dowel pin 128 slides around the third corner 414 on to the first segment 402, the connector 100 may be reset back to the unlatched state and in the resting position as shown in FIG. 7A. When the connector 100 is reset, the rod block 102 is back in an extended position relative to the track block 108 with the connector 100 ready to be actuated by the next push force.

In summary, embodiments of the present disclosure provide an apparatus for a robust push-push connector having a mechanism for adjustably coupling a first object to a second object. In particular, the apparatus described above is configured to latch and unlatch a rod block and a shuttle block connected therewith from a track block. The latching and unlatching in turn transition the rod block and shuttle block between a first stable state with the rod block and shuttle block extended from the track block and a second stable state with the rod block and shuttle block retracted towards the track block.

The connector described above enables the rod block to be transitioned between the two stable states in response to a push force applied to the rod block in a single direction (e.g., towards the track block). The connector includes a rigid and mechanically stable arm that connects the shuttle block to the rod block and that can withstand substantial mechanical stresses in all position/states. The arm is coupled to a torsion spring that keeps the arm lightly preloaded, and actuation of both the latching and unlatching mechanism is effected by application of the push force against the direction of the preload. Using the torsion spring to generate the preload on the arm permits the use of the rigid arm and eliminates any laxness in the apparatus. Accordingly, the described embodiments provide for a robust push-push mechanism.

While the foregoing is directed to embodiments of the present disclosure, other and further embodiments of the disclosure may be devised without departing from the basic scope thereof, and the scope thereof is determined by the claims that follow.

What is claimed is:

1. A push-push device for adjustably coupling a first object to a second object, comprising:
   a shuttle block configured to be coupled to the first object;
   an arm having a distal end and a proximal end, the distal end of the arm rotatably coupled to the shuttle block, and the proximal end of the arm slidably coupled to a recessed track in a track block configured to be coupled to the second object;
   one or more torsion springs disposed between the distal end of the arm and the shuttle block, wherein the one or more torsion springs are configured to apply a torsional preload force to the arm; and
   one or more linear preload springs extending between the track block and the shuttle block, wherein the one or more linear preload springs are configured to apply a linear preload force between a distal end of the track block and a proximal end of the shuttle block, and wherein:
   the distal end of the arm is configured to rotate relative to the shuttle block and the proximal end of the arm is configured to move along the recessed track of the track block in response to a push force applied to a distal end of the shuttle block and directed towards the distal end of the track block, and
   the push-push device is configured to transition between a first stable state and a second stable state when the proximal end of the arm moves along the recessed track in the track block in response to the push force; and
   a rod block for coupling the first object to the shuttle block, the rod block coupled to the shuttle block by a latch plate, and wherein the latch plate is configured to detach the rod block from the shuttle block when a tensile force applied to the rod block exceeds a maximum tensile load;
wherein the recessed track in the track block comprises:
a first segment, a second segment, and a third segment bordering a raised surface in the track block, the raised surface having a first corner, a second corner, and a third corner, and wherein:
the first segment is connected to the second segment at the first corner in the raised surface,
the second segment is connected to the third segment at the second corner in the raised surface, and
the third segment is connected to the first segment at the third corner in the raised surface;
wherein:
the proximal end of the arm is slidably coupled to the recessed track by a sliding member configured to slide along the recessed track between the first stable state and the second stable state when the push force is applied,
the sliding member is on the first segment and adjacent to the third corner when in the first stable state, and
the sliding member is on the second segment and adjacent to the second corner when in the second stable state;
wherein the torsional preload force applies a rotational force against the arm configured to keep the sliding member against a side wall of the raised surface inside the recessed track as the sliding member moves along the recessed track.

2. The push-push device in claim 1, wherein the push-push device is configured to transition from the first stable state to the second stable state when the sliding member is moved over the first corner from the first segment to the second segment by the push force.

3. The push-push device in claim 1, wherein the push-push device is configured to transition from the second stable state to the first stable state when the sliding member is moved over the second corner from the second segment to the third segment by the push force.

4. The push-push device in claim 1, wherein when the sliding member is in the first stable state when the push force is applied, the arm is configured to rotate and the sliding member is configured to move along the first segment towards the first corner.

5. The push-push device in claim 1, wherein when the sliding member is in the second stable state when the push force is applied, the arm is configured to rotate and the sliding member is configured to move along the second segment over the second corner.

6. The push-push device in claim 1, wherein after the push force is applied to move the sliding member over the second corner and the push force is released, the linear preload force and the torsional preload force are configured to automatically move the sliding member along the third segment and around the third corner to the first stable state.

7. The push-push device in claim 1, further comprising a rod extending between the track block and the shuttle block, wherein the shuttle block is configured to slide along the rod towards the track block when the push force is applied.

* * * * *